US006625341B1

(12) United States Patent
Novotny

(10) Patent No.: US 6,625,341 B1
(45) Date of Patent: Sep. 23, 2003

(54) OPTICAL CROSS CONNECT SWITCHING ARRAY SYSTEM WITH ELECTRICAL AND OPTICAL POSITION SENSITIVE DETECTION

(76) Inventor: Vlad J. Novotny, 16105 Cerro Vista Dr., Los Gatos, CA (US) 95032

( * ) Notice: Subject to any disclaimer, the term of this patent is extended or adjusted under 35 U.S.C. 154(b) by 88 days.

(21) Appl. No.: 09/880,456

(22) Filed: Jun. 12, 2001

Related U.S. Application Data

(63) Continuation-in-part of application No. 09/865,981, filed on May 24, 2001, now Pat. No. 6,483,962.
(60) Provisional application No. 60/211,239, filed on Jun. 12, 2000.

(51) Int. Cl.[7] .............................. G02B 6/26; G02B 6/42
(52) U.S. Cl. ............................ 385/18; 385/17; 385/19; 359/223; 359/224
(58) Field of Search .............. 385/16–23; 359/223–226, 359/290, 291

(56) References Cited

U.S. PATENT DOCUMENTS

| | | | |
|---|---|---|---|
| 5,724,123 A | 3/1998 | Tanaka | |
| 5,872,880 A | 2/1999 | Maynard | 385/88 |
| 6,097,859 A | 8/2000 | Solgaard et al. | |
| 6,252,466 B1 | 6/2001 | Kawamura | |
| 6,320,993 B1 * | 11/2001 | Laor | 385/16 |
| 6,483,962 B1 * | 11/2002 | Novotny | 385/18 |
| 2002/0186918 A1 * | 12/2002 | Burroughs | 385/18 |

FOREIGN PATENT DOCUMENTS

WO WO 200196924 A1 * 12/2001 ........... G02B/06/42

OTHER PUBLICATIONS

Bishop, D.J., Giles, C.R., Das, S.R., "The Rise of Optical Switching," Scientific American, pp. 88–94, Jan., 2001.
Blumenthal, D.J., "Routing Packets With Light," Scientific American, pp. 96–99, Jan., 2001.
Ehrfeld, W. and Bauer, HD, "Application of Micro– and Nanotechnologies for the Fabrication of Optical Devices," SPIE, vol. 3276, pp. 2–14, 1998.
Grade, J.D., and Jerman, H., "A Large–Deflection Electrostatic Actuator for Optical Switching Applications," Presented at Hilton Head 2000, pp. 1–4, 2000.
Laor, H., "Construction and Performance of a 576×576 Single–Stage OXC," LEOS, 3 pages, Nov. 8, 1999.
Laor, H., Fontenot, E., Richards A., D'Entremont, J., Hudson, M., Krozier, D., "Performance of a 576×576 Optical Cross Connect," NFOEC, pp. 1–5, Sep. 26, 1999.
James A. Walker, Topical Review "The future of MEMS in telecommunications networks." J. Micromech, Microeng. 10(2000) R1–R7. Printed in the UK.
D.J. Bishop, Presentation "Silicon Micromachines for Lightwave Networks: Can Little Machines Make it Big?" Lucent Technologies, Bell Labs Innovations. 83 pages. Feb. 1999.
David Bishop, "Silicon micromachines for lightwave networks: the little machines that will make it big." Dec. 2000. SPIE's Optics & Information Systems. 8 pages.

* cited by examiner

*Primary Examiner*—Hemang Sanghavi
*Assistant Examiner*—Scott A. Knauss

(57) ABSTRACT

An optical cross connect switch directs an optical data signal from an incoming optical fiber in a first fiber array to a first controllable mirror in a first controllable mirror array, a second controllable mirror in a second controllable mirror array into an outgoing optical fiber in a second fiber array. Single or multiple optical position sensing systems or electrical position sensing systems or their combination provide feedback control to the controllable mirror arrays.

97 Claims, 22 Drawing Sheets

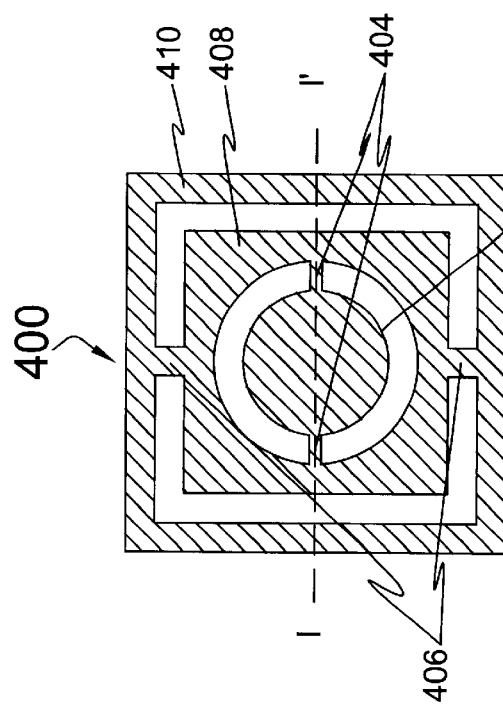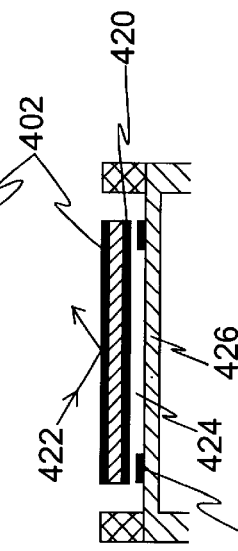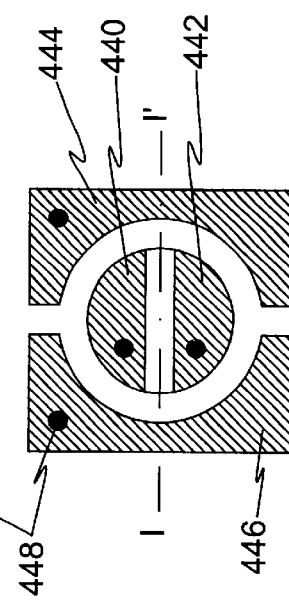
Figure 4(a):
Figure 4(b):
Figure 4(c):

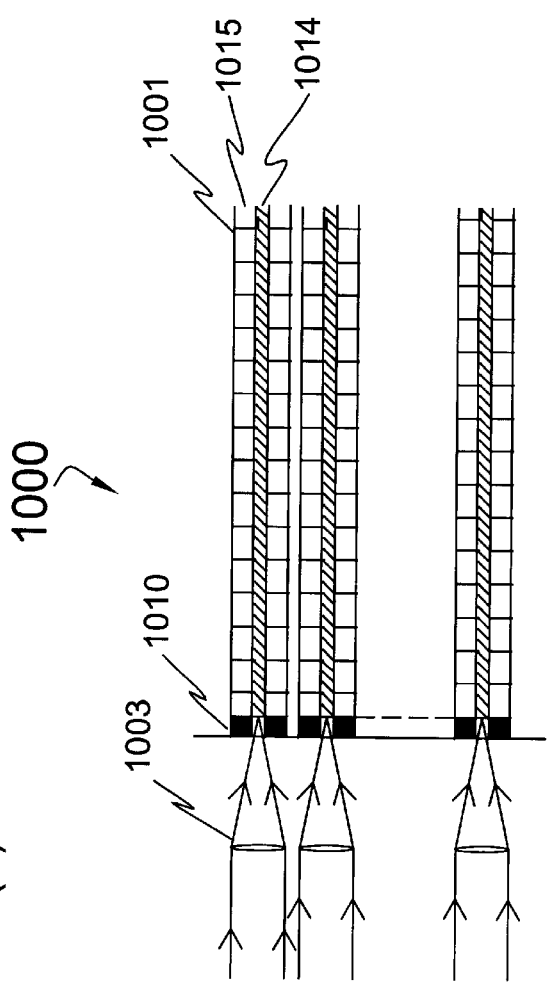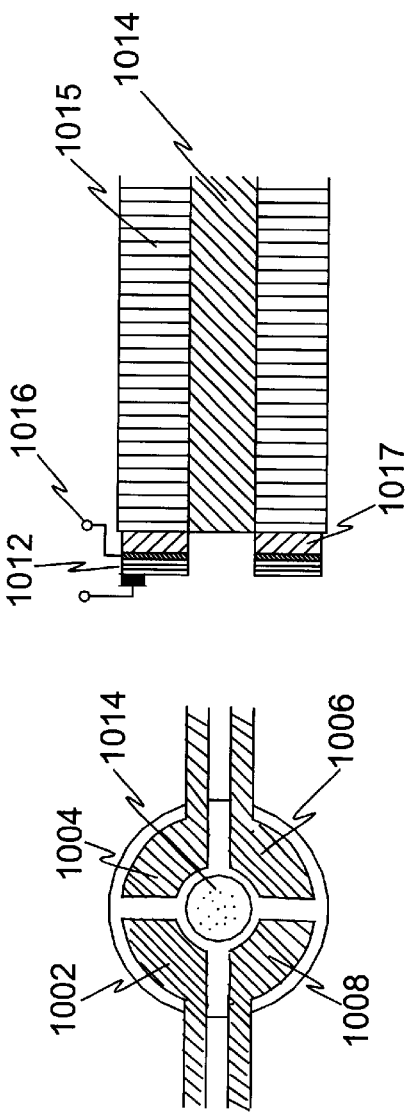
Figure 10(a):
Figure 10(b):
Figure 10(c):

US 6,625,341 B1

OPTICAL CROSS CONNECT SWITCHING ARRAY SYSTEM WITH ELECTRICAL AND OPTICAL POSITION SENSITIVE DETECTION

RELATED APPLICATIONS

This application is a continuation-in-part of U.S. patent Ser. No. 09/865,981, filed on May 24, 2001, U.S. Pat. No. 6,483,962, entitled, "Optical Cross Connect Switching Array System With Optical Feedback," by inventor Vlad J. Novotny. This application claims priority under 35 U.S.C. §119(e) from U.S. patent application Ser. No. 60/211,239, entitled, "Optical Cross Connect Switching Array Systems With Multiple Optical And Electrical Position Signal Detectors," by Vlad Novotny, filed Jun. 12, 2000. Both of the foregoing are incorporated by reference in their entirety.

BACKGROUND

A. Technical Field

The present invention relates generally to networking systems, and more particularly to optical cross connect switching in optical networks.

B. Background of the Invention

As the result of continuous advances in technology, particularly in the area of networking such as the Internet, there is an increasing demand for communications bandwidth. For example, the transmission of data over a telephone company's trunk lines, the transmission of images or video over the Internet, the transfer of large amounts of data as might be required in transaction processing, or videoconferencing implemented over a public telephone network typically require the high speed transmission of large amounts of data. As applications such as these become more prevalent, the demand for communications bandwidth capacity will only increase.

Optical fiber is a transmission medium that is well suited to meet this increasing demand. Optical fiber has an inherent bandwidth that is much greater than metal-based conductors, such as twisted pair or coaxial cable; and protocols such as the SONET optical carrier (OC) protocols have been developed for the transmission of data over optical fibers.

Optical fiber is used to form optical networks that carry data, voice and video over optical fibers using multiple wavelengths of light in parallel. Light is routed through the network from its originating location to its final destination. Since optical networks do not generally have a single continuous optical fiber path from every source to every destination, the light is switched as it travels through the optical network. Previously, this switching was accomplished using optical-electrical-optical ("OEO") systems, where the light signal was converted to an electrical signal, switched electrically, then output optically.

However, because in OEO systems the signal must be converted from optical to electrical, switched, then converted back to optical, the OEO systems were relatively large, complex, and expensive. More seriously, the electrical systems have slower performance than optical systems. This means that use of an OEO system creates a bottleneck in the optical network, and an OEO system is undesirable.

Much effort is being expended on the development of an all-optical cross-connect switching system, using a variety of different technological approaches: movable mirrors, acousto-optic diffraction, electro-optic refraction, magneto-optic switching, movable bubbles, and liquid crystal addressable arrays to name a few. Each of these technologies has its own performance characteristics, advantages and disadvantages.

Also, at times an optical cross connect switch resides at nodes in a ring-mesh network and light signals received at the node may be of widely varying intensity. It is typically desirable to equalize the intensity of the signals before they are amplified or routed to another node.

Thus, what is needed is an optical cross connect switching system to switch optical signals in the optical domain, without converting the optical signals to electrical signals. The system preferably should also have the capability to equalize the intensity of the signals.

SUMMARY OF THE INVENTION

The present invention is an optical cross connect switching system. In one embodiment, a first optical fiber array carries optical destination signals and optical data signals. A switch configuration controller demultiplexes, converts optical signals to electrical signals and decodes the optical destinations for the optical data signals. A first mirror array controllably reflects the optical data signals from outputs of the first optical fiber-lens array. A second mirror array controllably reflects the optical data signals from the first mirror array. A second optical fiber-lens array receives the optical data signals reflected from the second mirror array. A position detector array detects the position of the optical data signals reflected from the second mirror array. A switch configuration controller uses the decoded optical destination signals and the detected position of the optical data signals to control the first and second mirror arrays to correctly direct the optical data signals from the first optical fiber array to the second optical fiber array.

BRIEF DESCRIPTION OF THE DRAWINGS

FIGS. 4(a) through 4(c) show one embodiment of a controllable MEMS mirror system.

FIGS. 10(a), 10(b) and 10(c) illustrate another embodiment of a position sensitive detector array.

DETAILED DESCRIPTION OF THE PREFERRED EMBODIMENTS

Embodiments of the present invention are now described. In general, a light beam from any incoming fiber is switched to any outgoing fiber with minimum light intensity loss and minimum crosstalk.

System Overview:

An optical cross connect switch system switches an optical signal carried by a light beam from any incoming fiber to any outgoing fiber. For clarity, some of the figures and description portray the data as traveling one way from incoming fibers to outgoing fibers. However, it should be understood that data travel can also be bidirectional. In a bidirectional switch, data travels both ways through the switch, with each fiber acting as both an incoming fiber and as an outgoing fiber, although not at the same time. To accomplish this, the system has symmetrical functionality, with some elements of the switching system that are described and shown as on only one side (incoming or outgoing) actually having duplicate counterparts (not shown) on the other side.

If there are N incoming fiber lines and M outgoing fiber lines, the optical cross connect switch is referred to as an N×M switch. For short haul applications, N and M are less than 32. For long haul applications, N and M are generally each in the range from 1024 to 4096.

Figure 1:
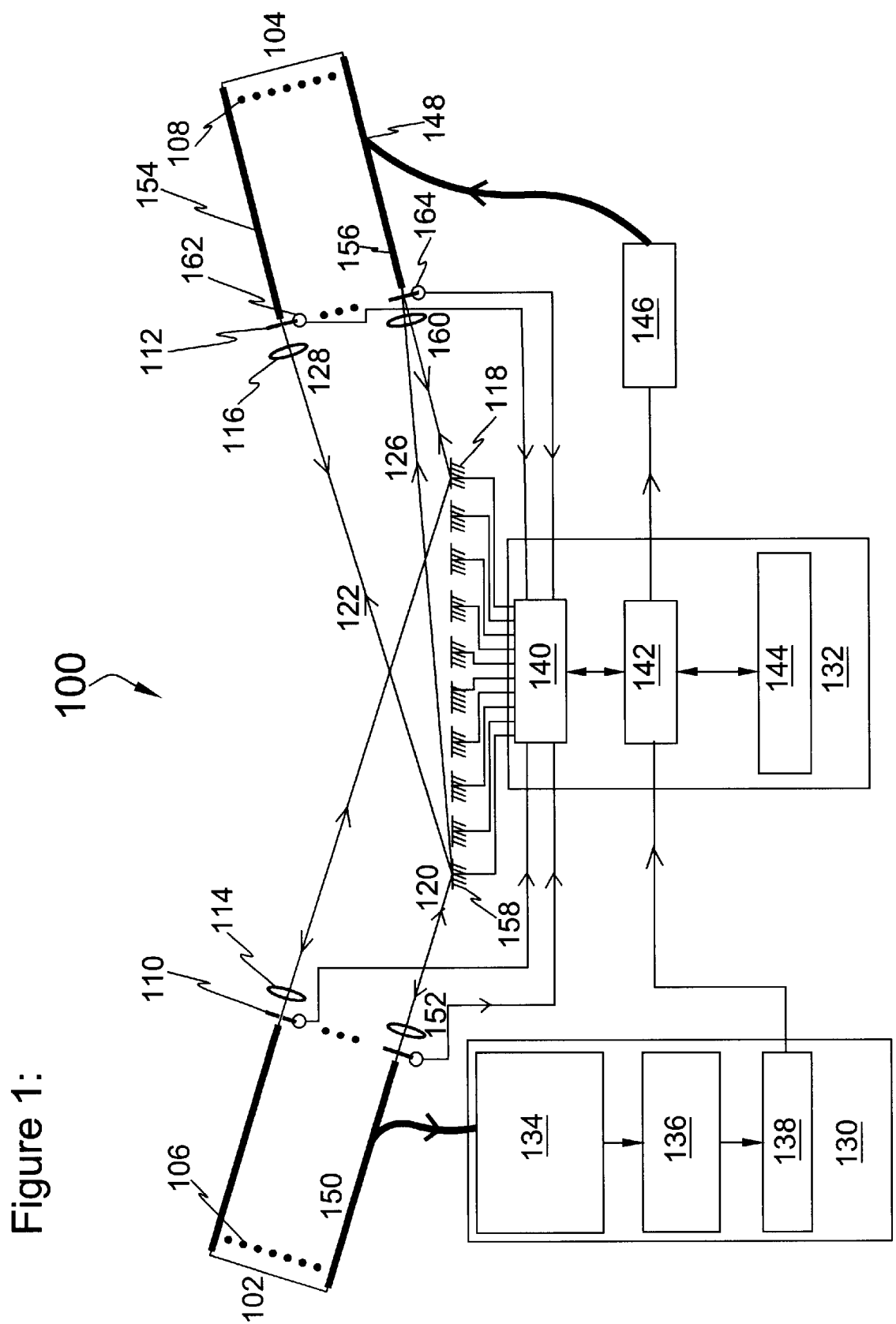
FIG. 1 is a diagram showing an overview of an N×M optical cross connect switching array system.

FIG. 1 is a diagram showing an overview of an N×M bidirectional optical cross connect switching array system 100. The system 100 comprises the following building blocks:

1. Arrays of fibers 102 and 104 with their respective alignment structures 106 and 108.
2. Lens arrays 114 and 116, which are used to collimate the outgoing light beams and increase coupling efficiency of incoming light beams. Typically, the lens arrays 114 and 116 collimate light exiting from the fibers and focus light entering the fibers.
3. Position sensitive detector arrays 110 and 112 for sensing the position of the light beams entering into fibers.
4. A mirror array 118 to direct the light beam from any incoming fiber to any outgoing fiber.
5. Servo electronics 140 to control deflection of mirrors in the mirror array 118, which directs light beams to selected destinations, aligns light beams onto the outgoing fibers, and maintains optimum positioning of the light beams.
6. A switch configuration controller 130 comprising a single channel demultiplexer 134, a photodetector and amplifier 136 and a decoder 138 to determine the destination for the light from each fiber, used to dynamically control the cross connect switch 100 configuration.
7. Fiber splitters coupled to photodetectors to monitor intensities of light coupled into each fiber (not shown in FIG. 1).
8. A system controller 132, in this case comprising a digital signal processor 142, application programming interface 144, and the mirror servo electronics 140 to control the mirror array 118.

The following description addresses the switching of a light beam from one of the fibers 150 in array 102 to fibers in array 104. However, the description is equally applicable to switching a light beam between any fiber in array 102 to any fiber in array 104, or from any fiber in array 104 to any fiber in array 102.

A beam of light 120 is carried on a given individual incoming fiber 150 in the incoming fiber array 102. The beam of light 120 is capable of containing multiple parallel streams of optical data signals at multiple wavelengths. The beam of light 120 is also capable of containing streams of optical destination signals carrying information identifying the destination for each optical data signal within the beam.

In this example, the optical destination signal contains instructions on routing of data signals and configuration of the whole switching array. The optical destination signal is carried on one data channel in one selected incoming fiber 150. The light beam on the selected incoming fiber 150 is split. One part is sent to the switch configuration controller 130, which interprets the instructions on the routing of data. Within the switch configuration controller 130, a single channel wavelength division demultiplexer 134 selects the channel containing the instructions. A photodetector with amplifier 136 converts the optical signals into electrical signals that are decoded by decoder 138. The decoded signal provides information for the proper configuration of the switch system 100. In one embodiment, the single channel demultiplexer 134 is a Fiber Bragg grating. Other demultiplexers are used in other embodiments. In a preferred embodiment, the system 100 is one node in a larger network with a mesh or mesh-ring type architecture. In this case, wavelength division demultiplexer 134 is generally required only on one side but for redundancy reasons can be included on the "outgoing" side also. Decoded signals are fed into digital signal processor 142 within the switch configuration controller 132 that provides instructions to servo electronics 140. The servo electronics 140 then position the mirrors in the mirror array 118 to correctly route the data signals. In alternate embodiments, the instructions for routing data may be obtained in other manners, for example by providing configuration instructions electrically, using electrical communication between nodes of the cross connect switching system. Also, in some embodiments, the system controller 132 includes an application programming interface 144 for controlling and monitoring performance of the whole cross connect switching system.

The beam of light 120 exits the fiber 150 in a diverging manner. Beam 120 is collimated with lens 152 so that the beam propagates without significant divergence to a first mirror 158 in the mirror array 118. The first mirror 158 has been positioned by the mirror servo electronics 140 to direct the beam of light along a first optical path 122 to the second lens 128 in the second lens array 116. The second lens 128 focuses and couples most of the light 120 into the outgoing fiber 154 in the outgoing fiber array 104. This way, minimum optical energy is lost as the light passes through the switching system 100 and insertion losses are minimized.

The beam of light 120 is positioned to maximize the amount of the light coupled into the core of the outgoing fiber 154. In the embodiment shown in FIG. 1, this is accomplished through position sensitive detector arrays 110 and 112 placed in front of the fibers. In other embodiments, position sensitive detectors are placed in different locations. In still other embodiments, the position of the mirrors are detected instead of or in addition to detecting the position sensitive detectors to determine the path of the light beam 120.

As illustrated in FIG. 1, position sensitive detector 162 within the position sensitive detector array 112 detects the position of the light beam entering the outgoing fiber 154. The position sensitive detector 162 provides signals that indicate the position of the light beam 120 with respect to the core of the outgoing fiber 154 in the outgoing fiber array 104. In some embodiments, the position detectors detect the light beams that carry the optical data signals. In other embodiments, the position detectors detect registration light beams that have a different wavelength than the light beams that carry the optical data signals, but which propagate along the identical optical path as the light beams that carry the optical data signals. The position detectors generate a feedback signal that drives the servo electronics for each set of two mirrors, provides the initial alignment after switching and maintains this alignment continuously and dynamically until the instructions for reconfiguration are received through demultiplexer-receiver system. Embodiments of position sensing devices, such as bilateral photodetectors, quadrant photodetectors, charge coupled device imaging arrays, complementary metal oxide semiconductor device imaging arrays, or infrared imaging arrays, are placed in several alternative locations in alternative embodiments to act as the position sensitive detector arrays 112 and 110 and generate position error feedback signals for the system controller 132 that controls mirror positioning.

For maximum light to enter the outgoing optical fiber, the light beam 120 is positioned over the core of the outgoing optical fiber 154. Deviation of the light beam 120 from the optimized position over the core of fiber 154 causes a deviation in the feedback signal that is generated by the position sensitive detector array 112 and fed into the switch configuration controller 132. The mirror servo electronics 140 within the system controller receives the feedback signal and in response controls the deflection of the mirror 158 to align the light beam 120 into the outgoing fiber 154. FIG. 1 shows the position sensitive array 112 as being directly in front of the outgoing fiber array 104. However, in other embodiments, the position sensitive array 112 is placed in alternate locations in the optical cross connect switching system 100.

In the embodiment shown in FIG. 1, the digital signal processor 142 generates a new destination signal or other signal to provide information on the status of the optical cross connect switching system 100. This signal is sent on a selected fiber in the outgoing fiber array 104 to other switches at other nodes of the network or to a network manager. This signal allows proper switching at other switches on the network. The digital signal processor 142 sends this signal to the transmitter 146, which converts the signal to an optical signal. The transmitter 146 then couples the optical destination signal to the one selected outgoing fiber in the outgoing fiber array 104 via a multiplexer 148.

When light beam 120 is to be switched into a second outgoing fiber 156, the switch configuration controller 130 receives a destination signal identifying the new destination outgoing fiber 156. The switch configuration controller 130 sends the new destination to the system controller 132, which repositions the mirror 158 in the mirror array 118 so that beam 120 follows the optical path 126 to the lens 160 in the second lens array 116. The lens 160 focuses and couples most of the light 120 into the outgoing fiber 156 in the outgoing fiber array 104, using feedback from the position sensitive array 112 as described above.

In a similar manner, the light beam 120 can be directed to any outgoing fiber in the outgoing fiber array 104. The switch configuration controller 130 determines the destination for light carried by all the incoming fibers. The system controller 132 controls the deflection of the mirrors in the mirror array 118 to direct the light to the destination outgoing fiber. The position sensitive detectors in the position sensitive array 112 provide feedback to optimally position the light beam over the core of the outgoing fiber.

In bidirectional embodiments, light beams also travel from the outgoing fibers in the outgoing fiber array 104 to incoming fibers in the incoming fiber array 102. This is done in the same way as light beams traveling from incoming fibers in the incoming fiber array 102 to outgoing fibers in the outgoing fiber array 104. The switch configuration controller 130 receives the optical destination signal from the fibers 104, the system controller 132 positions the mirrors in the mirror array 118 to direct the light beams to the appropriate fibers 102, and the position sensitive array 110 provides feedback to optimally position the light beam over the core of the fibers 102.

The fiber arrays 102 and 104, alignment structures 106 and 108, position sensitive detector arrays 110 and 112, lens arrays 114 and 116, and mirror array 118 are shown as one-dimensional in the embodiment of FIG. 1 for clarity. In preferred embodiments, the arrays are two-dimensional. For example, in an embodiment with a two-dimensional mirror array 118, there are rows and columns, or some other two-dimensional arrangement of mirrors. The other arrays and alignment structures are similarly two-dimensional in some embodiments. In addition, the overall system is shown as two-dimensional in FIG. 1. In preferred embodiments, the system is three-dimensional, as the additional dimension in and out of the plane of the paper can be advantageously used to position the various components.

In some embodiments, the feedback from the position sensitive arrays 112 is used to intentionally and controllably misalign a light beam with respect to the core of its outgoing fiber. In this way, attenuation is introduced. The attenuation can be set to different levels, using the feedback to maintain the attenuation at the desired level. In embodiments where the mirror array 118 is used simply to vary this attenuation but not to switch between fibers, then the result is a variable optical attenuator (VOA). In embodiments where both the switching and variable attenuation capabilities are utilized, the result is an optical switch with equalization.

Figure 2:
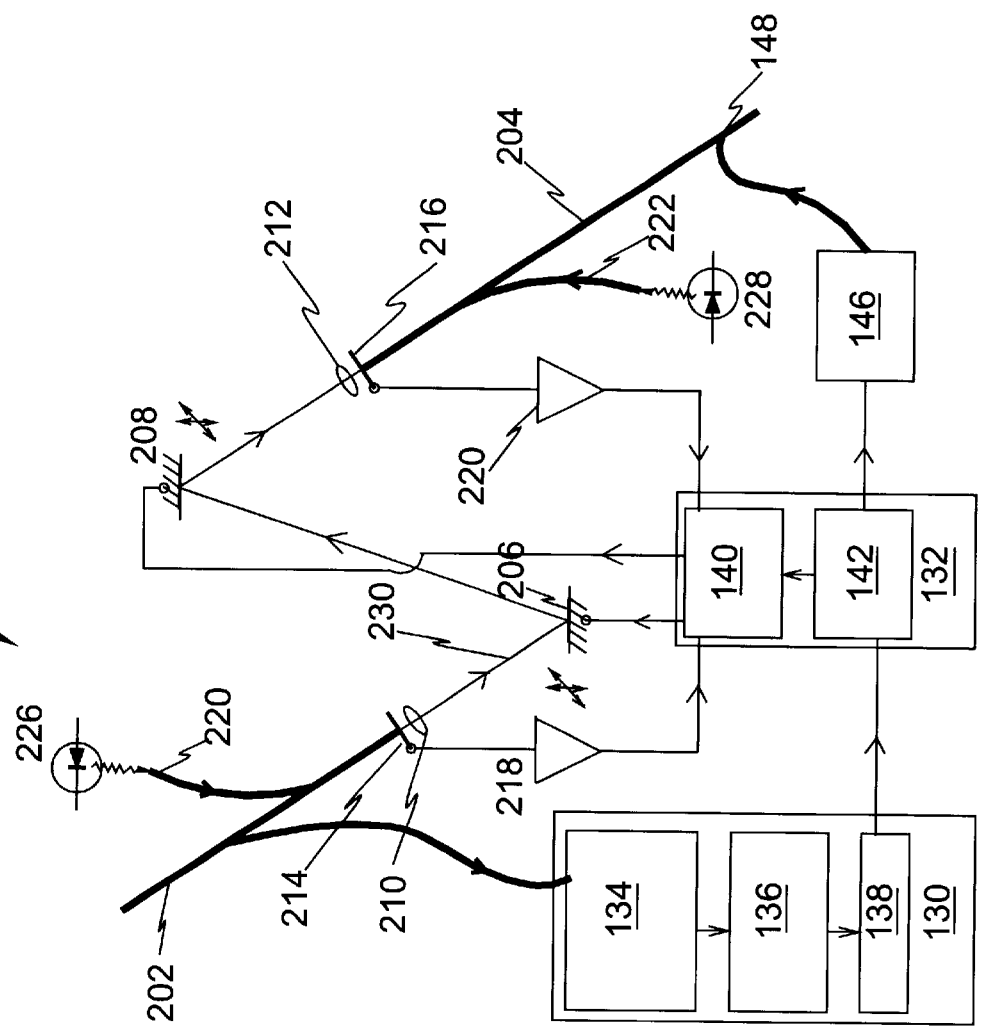
FIG. 2 shows a portion of another embodiment of an optical cross connect switching system that uses two mirror arrays.
Figure 3:
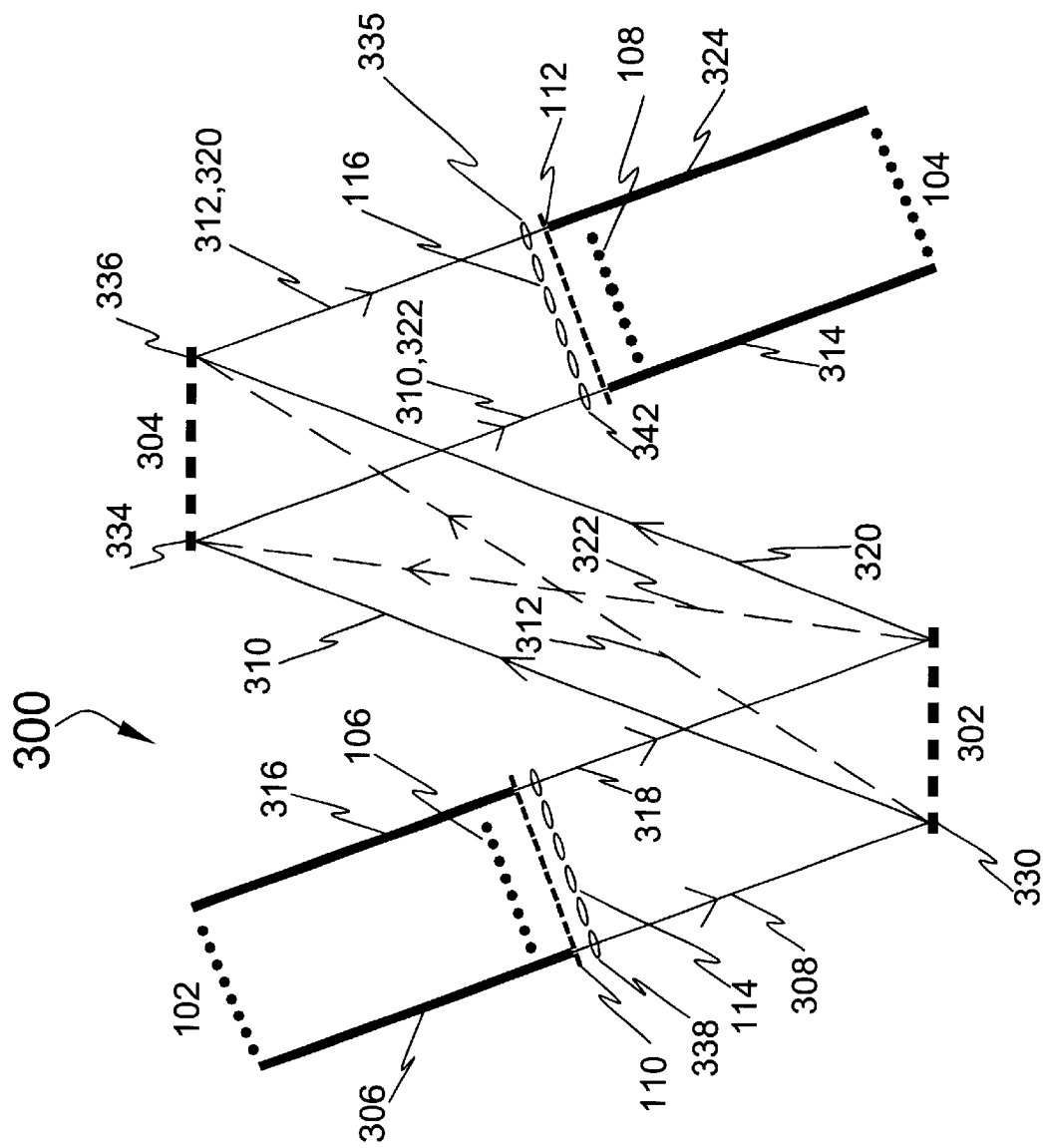
FIG. 3 shows more detail for the optical cross connect switch of FIG. 2.

FIGS. 2 and 3 show other embodiments of an optical cross connect switching system 200 that uses two mirror arrays. By using two mirror arrays, the optical cross connect switching system 200 of FIGS. 2 and 3 directs a light beam from any incoming fiber into any outgoing fiber with optimal light coupling. By using appropriate deflections of the mirrors in the mirror arrays, the central ray of the light beam impinges any of the outgoing fibers in parallel with the fiber axis.

In addition, FIG. 2 illustrates the use of registration beams, generated by sources 226 and 228 respectively, for position sensing and feedback.

For simplicity, FIG. 2 depicts only one incoming fiber 202, one outgoing fiber 204, the fibers' associated lenses 210 and 212 and position sensitive detectors 214 and 216, one mirror 206 in the first mirror array, and one mirror 208 in the second mirror array. It is to be understood that the principles illustrated are also applicable to arrays, as described with respect to FIG. 1. FIG. 3 shows a system 200 based on these principles but using arrays of devices. However, FIG. 3 is simplified to clearly show the paths of the light beams.

FIG. 2 illustrates a light beam 230 traveling from incoming fiber 202 to outgoing fiber 204. In FIG. 2, the data light beam 230 exits from the incoming fiber 202 and is collimated by lens 210 to propagate to the outgoing lens 212 without significant divergence. Initially, data light beam 230 is directed to the mirror 206 that in turn directs the beam onto the mirror 208. The mirror 208 is chosen because it is the mirror that is aligned to allow the central axis of the light beam 230 to travel a path to the outgoing fiber 204 that is parallel with the axis of the outgoing fiber 204. Mirror 208 is angled to a position to reflect the light beam 230 toward the outgoing fiber 204 along the path that is parallel with the axis of the outgoing fiber 204. The lens 212 focuses data beam 230 onto the core of outgoing fiber 204. The fibers 202 and 204, lenses 214 and 212 and mirrors 206 and 208 are positioned so that the data beam 230 is coarsely positioned onto outgoing fiber 204 or in its vicinity. In the embodiment shown in FIG. 2, the fine positioning of the outgoing data beam 230 onto the core of the fiber 204 is accomplished with the position sensitive detector 216 and mirror servo electronics 140. The position sensitive detector 216 generates position error signals in two directions and these two signals are amplified with amplifiers 220, processed to determine two position errors and fed into the servo electronics 140 that provides closed loop control of position, as is well known to those skilled in the art of the feedback servo control. Feedback from the detector 216 is used to control both mirror 208 and mirror 206. In some embodiments, the mirror deflection angles are correlated and they are moved as a couple with substantially identical deflection angles. This provides the advantages of coupling the maximum light intensity into the outgoing fiber 204 and minimizing optical insertion losses.

In addition, fiber 220 in FIG. 2 is included to provide alternative registration light source at wavelength λs that is different than data wavelengths λ1 . . . λn. The registration light source at wavelength λs is coupled to the incoming fiber. Thus, the registration light travels the same path as the wavelengths carrying the data signals. Consequently, the position sensitive detector 216 can detect the position of either the data signals or the registration light signal at wavelength λs. When data beams are used for position sensing, the position sensitive detector 216 has high sensitivity at infrared communication wavelengths. Such position sensitive detectors are typically more expensive than detectors that operate at shorter wavelength. Consequently, it may be less expensive to include registration light beam with wavelength λs. In this case, detectors 216 are selected with high sensitivity at wavelength λs.

The optical cross connect switching system in FIG. 2 is bi-directional. At one time period, the data traffic flows from fiber 202 to the fiber 204. At another time period, traffic flows in the opposite direction, i.e. from fiber 204 to fiber 202. Consequently, additional devices are included in the system. The position sensitive detector 214 and amplifier 218 are additional devices included in the system to allow bi-directional data flow. The position sensitive detector 214 and amplifier 218 play the same role for traffic from fiber 204 into fiber 202 as components 216 and 220 do for traffic from fiber 202 into fiber 204. Similarly, registration light source 228 and fiber 222 are additional devices included in the system to allow bidirectional data flow. The function of registration light source 228 and its fiber 222 is the same as light source 226 and fiber 220 except that registration light source 228 and its fiber 222 are active when traffic travels from fiber 204 to fiber 202. Switch configuration controller 130 and system controller 132 operate in the same manner as in FIG. 1.

FIG. 3 shows more details of the optical cross connect switch 200 of FIG. 2. This figure also demonstrates how the two mirrors 206 and 208 in FIG. 2 and two sets of mirrors 302 and 304 in FIG. 3 direct the light from any incoming fiber to any outgoing fiber at an angle at which the central axis of light incident onto the outgoing fiber is substantially parallel with the outgoing fiber axis. Moreover, FIG. 3 clarifies how the switch 200 works with arrays of fibers and mirrors, and sends a light beam from any incoming fiber to any outgoing fiber. Thus, FIG. 3 includes the multiple incoming and outgoing fibers and multiple mirrors in the two mirror arrays.

When light 308 from fiber 306 is supposed to be directed into fiber 314, beam 308 is collimated with lens 338 in lens array 114, reflected from mirror 330 in mirror array 302 to follow path 310 onto mirror 334 in mirror array 304 and from mirror 334 onto lens 342 in lens array 116 that focuses the light into fiber 314. When light 308 from fiber 306 is to be switched to fiber 324, mirror 330 is deflected so that the light beam 308 follows path 312 and travels to mirror 336 in mirror array 304 and then, after appropriate deflection from mirror 336 it travels along path 312 to lens 334 in lens array 116 and fiber 324. With the two mirror arrangement, central rays of the light beam 308 are directed to follow optical paths, such as paths 310 and 312, from any incoming fiber to any outgoing fiber that are parallel with the axes of outgoing fibers 314 to 324. This allows the beam 308 to couple into the outgoing fiber with minimum insertion losses. If the light beam 308 drifts from the optimized position on cores of the outgoing fibers, position sensitive detectors in the position sensitive detector array 112 provide a position error signal to servo electronics that corrects position of mirrors in mirror arrays 302 and 304.

The previous description outlined the architecture of the system and how the system works. A detailed description of components follows.

Mirror Arrays:

Mirror arrays can be either one- or two-dimensional, depending on whether the fiber array is one- or two-dimensional. Typically, smaller fiber arrays are one-dimensional, and large systems are two-dimensional. A diagram of one mirror from the mirror array is shown in FIGS. 4(a) through 4(c). The mirrors themselves preferably tilt in two directions in order to switch the light between outgoing fibers and to make two-directional rotational corrections of the position of a light beam with respect to a core of optical fiber. In this case, the first set of hinges 404 allows rotation around the first axis and the second set of hinges 406 permits rotation around a second axis that is perpendicular to the first axis. The mirrors preferably use two-directional actuators (i.e., actuators which permit the mirror to tilt in both the positive and negative direction with respect to an axis) in order to accomplish the full two-directional rotation correction. In alternate embodiments, one-directional actuators are used instead of two-directional actuators. One-directional actuators provide a mirror that tilts on only a single axis in a positive or a negative direction. In these alternative embodiments, four one-directional mirror arrays are used rather than the two two-directional mirror arrays shown in FIG. 3.

Several different technologies for driving and fabricating the mirror arrays and controlling the deflections of the mirrors in the arrays are employed in different embodiments. Driving technologies include electrostatic, electromagnetic, piezoelectric, thermally activated mirrors, and other types of driving technologies. One embodiment is based on two-directional, macroscopic electromagnetic galvanometer actuators fabricated with discrete mirrors, coils and magnets such as those used in optical recording drives. Two independent electric currents pass through two separate current loops, and two sets of magnetic fields are applied so that the current, magnetic field and resulting torque vectors are all perpendicular to each other. Electromagnetic galvanometer mirrors fabricated with multiple electrical turns around the mirror and the inner frame and two sets of magnets represent one implementation of two-dimensional rotating actuator. In other embodiments, the mirror arrays are Micro Electro Mechanical Systems (MEMS), which provide improved performance and low cost.

FIGS. 4(a) through 4(c) show one embodiment of a controllable MEMS mirror system 400, controlled by electrostatic driving technology. FIG. 4(a) shows a top view, FIG. 4(b) shows a side view, and FIG. 4(c) shows a bottom view. The MEMS mirror system 400 includes a mirror 402. In the embodiment illustrated in FIGS. 4(a)–4(c), the mirror has a circular shape. In other embodiments, the mirror 402 is rectangular or of another shape. As seen in FIG. 4(a), the MEMS mirror system 400 has two sets of hinges 404 and 406 that are placed perpendicularly to each other so that each hinge pair allows angular deflection around their respective axes. The outer set of hinges 406 allows one directional rotation of the inner frame 408 with respect to the outer frame 410. The inner set of hinges 404 allows one directional rotation of the mirror 402 with respect to the inner frame around axis that is perpendicular to the outer rotation axis.

The length, width, thickness and cross sectional shape of hinges determine the stiffness and consequently the voltages required to achieve desired deflections. The hinge stiffness is proportional to the hinge width and the third power of hinge thickness and inversely proportional to hinge length. The hinge thickness is optimized so that the stiffness is minimized but the structure is not too fragile so that it would not survive separation after fabrication, handling during assembly and shock and vibration in typical environment. In some embodiments, the hinges are single, double, triple or quadruple serpentine hinges. This provides the advantage of allowing relatively narrow hinge width and long hinge length to minimize stiffness.

The reflecting surface of the mirror 402 is covered with materials that have very high reflectivity in the operating wavelength range. For optical communications, the operating range is usually from 900 to 1600 nm. Most metal films have higher than 95% reflectivity in this range, and with two reflections, 90% of the signal is preserved. In one embodiment, gold film is the material used because it has 99%+ reflectivity at optical communication wavelengths and long-term stability due to its resistance to corrosion and other degradation.

The mirror 402 and inner frame 408 are made of electrically conducting material (e.g. doped silicon) or of nonconducting material (e.g. undoped silicon) that is coated with electrically conducting film on the bottom side (light 422 is reflected from the top side of mirror 402). This bottom conductive side is connected to a common electrode 420 that is typically kept at ground. Film material and thickness on the top and bottom of the mirror and inner frame are typically substantially the same in order to avoid distorting the mirror by differential stress. Cr, Ta, Ti, and other metals are used below the optically reflecting film to improve adhesion of metals such as Au to the mirror surfaces. The driving electrode structure is defined below the mirror with an air gap 424 that is adjusted according to mirror dimensions, desired deflection angles, torque constants of hinges and voltages planned for full deflections (typically equal to 30% of the air gap between two plates of parallel capacitor to avoid snapping instability of the mirrors). As seen in FIG. 4(c), driving electrodes are divided into four segments 440, 442, 444 and 446, with two segments controlling deflections in one direction. The segments are in pairs, the first pair being segments 440 and 442, and the second pair being 444 and 446. The 440–442 pair is used to tilt the mirror 402 about the hinge 404. Applying a voltage to one segment 440, while keeping the other segment 442 and top electrode 420 at ground, tilts the mirror 402 so that the gap between electrode 440 and mirror 402 is decreased. Applying a voltage to the other segment 442, while keeping segment 440 and top electrode 420 at ground, tilts the mirror 402 in such a way that the gap between electrode 442 and moving mirror is decreased. Inner frame 408 is tilted in the same manner, using segments 444 and 446.

Four fixed electrodes 440, 442, 444 and 446 together with movable mirror 402 and movable inner frame 408 form four parallel plate capacitors. In other words, mirror 402 and inner frame 408 are part of the common movable electrode that is typically held at ground. Based on the position of the light with respect to the outgoing fiber, a voltage difference Vij1 is applied to electrode 440 to obtain a deflection $\alpha_{ij}1$ of the mirror around a first axis. A voltage difference Vij2 is applied to the electrode 444 in order to obtain a deflection $\alpha_{ij}2$ of the mirror around a second axis. The indices i and j represent the row and the column of the mirror in the mirror array, respectively. In embodiments with two mirror arrays, such as shown in FIGS. 2 and 3, another pair of voltages, Vkl1 and Vkl2 is applied to two electrodes of a second mirror actuator in the second mirror array. The pair of voltages Vkl1 and Vkl2 provides deflections $\beta_{kl}1$ and $\beta_{kl}2$ in the second mirror. In one embodiment, typically $\alpha_{ij}1$ is substantially equal to $\beta_{kl}1$ and $\alpha_{ij}2$ is substantially equal to $\beta_{kl}2$.

In some embodiments, the actuators are two-directional electrostatic rotational comb actuators. One such rotational comb actuator is described below with respect to FIG. 15. In electrostatic rotational comb actuators, rotational motion is generated by attractive forces between oppositely charged combs of an edge capacitor. Two sets of hinges are employed to provide rotational motion in two directions. Up to six leads connect electrical voltage sources with combs. For large arrays, leads are routed along the walls of the top wafer onto the lower wafer that contains driving electronics. Rotational comb designs have leads incorporated on movable electrodes and no bottom electrodes are required. The leads are brought along the walls toward the bottom wafer that contains driving electronics. The interconnections between the top and bottom wafers are fabricated with solder reflow.

In embodiments with large arrays, the electrodes preferably are addressed by a row (or column) of mirrors at the same time and then held at the addressing voltages on these electrodes until the same line is re-addressed again. This approach requires matrix addressing with at least one transistor and one storage capacitor for each pair of top and bottom electrodes (e.g., see the discussion with respect to FIG. 11 below). The capacitor plates 440, 442, 444 and 446 can be connected to electrical driving circuitry 426 with vias 448.

In one embodiment, bulk and surface micromachining methods are used to build these structures. The material for the mirror and hinges is a single crystal silicon with very low concentration of impurities and defects, which provides a long lifetime for the hinges. Alternative materials are polysilicon, metals or metal alloys such as berylium-copper. In some embodiments, the mirror and hinges are fabricated with different thickness, which provides the advantage of avoiding excessive wavefront distortions of light reflected from the mirror.

In one embodiment, the fabrication process for structures with different hinge and mirror thicknesses is based on bulk micromachining of double layer silicon-on-insulator (SOI) wafers. The double layer structure is produced by oxidation of silicon wafers, their lamination (internal silicon dioxide layer will be referred to as the first silicon dioxide layer), grinding to reduce the thickness of the silicon layer to the desired thickness of hinges, deposition of another silicon oxide layer (the second silicon dioxide layer), lamination of another silicon wafer and then repeating the process of grinding the wafers to the desired thickness equal to approximately to mirror thickness. Alternatively, epitaxial growth of single crystal silicon is substituted for grinding for one silicon or both silicon layers. The epitaxial option provides good control of thin layers with a good thickness uniformity.

Figure 5A:
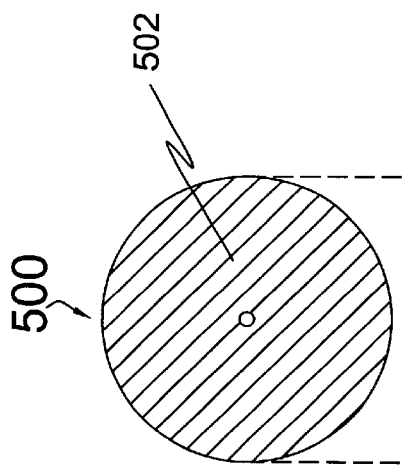
FIGS. 5(a) through 5(c) show an alternative embodiment of a controllable MEMS mirror system.
Figure 5B:
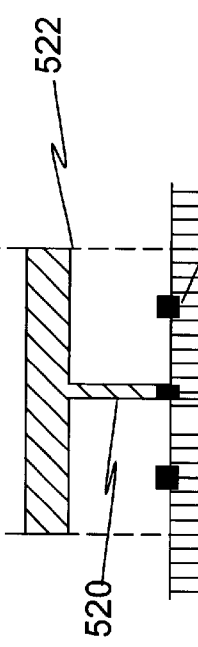
Figure 5C:
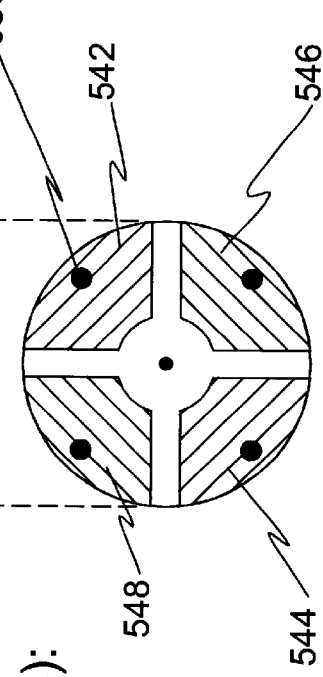

The fabrication steps with double layer SOI wafer are as follows:
a. oxidation of both sides of the silicon wafer
b. photolithography and etching of silicon dioxide of the bottom side of SOI wafer; separation lines and alignment keys are also etched
c. photolithography and deep, wet silicon etching of the bottom side of the SOI wafer with the first internal silicon dioxide layer acting as the etch stop
d. photolithography on the top side of the wafer for open areas in final structure and etching of silicon dioxide
e. deep, dry reactive ion etching of silicon with the second internal silicon dioxide as an etch stop
f. photolithography for hinges and open areas and etching of silicon dioxide
g. deep, dry reactive ion etching of silicon hinges and open areas in the final structure with the second internal silicon dioxide layer as etch stop
h. etching of silicon dioxide in the exposed areas to open all gaps in silicon
i. metallization of top and bottom with metallic adhesion layer(s) and high reflectivity material such as gold
j. driving electronics on the bottom wafer
k. deposition of insulating layer
l. photolithography and etching of vias for electrical contacts between electronics and electrodes
m. photolithography and silicon etching of gap defining grooves and lock part of alignment structures
n. deposition of metallic layer for electrode fabrication
o. photolithography and etching of conductive electrodes on the bottom wafer FIGS. 5(a) through 5(c) show an alternative embodiment of a controllable MEMS mirror system 500 with a torsional post arrangement. FIG. 5(a) shows a top view, FIG. 5(b) shows a side view, and FIG. 5(c) shows a bottom view. In the embodiment shown in FIGS. 5(a) through 5(c), the mirror system 500 has one hinge post 520 that allows mirror deflections in two directions. The torsional post design shown in FIG. 5 includes four electrodes 542, 544, 546 and 548, but in some embodiments, complete two-directional tilting is achieved using three electrodes. The mirror 502 comprises the second electrode of parallel plate capacitors. The movable mirror 502 is normally held at ground and it is interconnected to the driving electronics through the post 520 and underlying via. Driving voltages are applied between electrodes 542, 544, 546 and 548 and movable plate 522 in a manner similar to that described in FIGS. 4(a) through 4(c). When rotational deflection in which the gap on the right hand side 524 of post is supposed to be reduced, the same voltage is applied to electrodes 542 and 546 while electrodes 544 and 548 and the movable mirror 502 are kept at ground. Electrostatic force pulls the right side 524 of the movable mirror 502 towards electrodes 542 and 546 and generates electrostatic torque that bends the post 520 thus allowing the desired mirror deflection. Other mirror deflections are generated by selecting two electrodes out of four electrodes and applying two different voltages to them, while keeping two remaining fixed electrodes at ground together with the top (movable mirror) electrode.

In alternative embodiments, electromagnetic actuators are built to drive the mirror 502 with one central torsional post. Electrical coils with single or multiple turns are placed on the bottom of the mirror and magnets are located on the sides of mirror assembly. Two or more independent coils and corresponding two or more sets of magnets generate electromagnetic torques in two directions. In yet another embodiment, the placement of coils and magnets are reversed with magnets on the mirror and coils on the base.

A fabrication method for these types of torsional post actuators relies on LIGA (Lithography/ Electroplating/ Molding). It involves the following steps: photolithography, electroplating or vacuum deposition of the first material, removal of photoresist, deposition of the second material by electroplating or by vacuum deposition, planarization and repetition of the preceding steps for as many layers as needed. The final fabrication step normally involves removal of sacrificial material in order to release the structure.

Position Detectors:

Returning to FIG. 3, the mirrors in the mirror arrays 302, 304 of the optical cross connect switch system 200 are maintained in aligned positions directing incoming light beams to the correct outgoing fibers during operation. Then, when reconfiguration instructions are received, the mirrors 302, 304 are moved to new positions to redirect the incoming light beams to the new correct outgoing fibers. The tasks of alignment maintenance and mirror array repositioning are accomplished through closed loop control of the mirror positions. Position sensitive detector arrays 110, 112 are periodically scanned. Based on the positions determined by scanning the position sensitive detector arrays 110, 112, the control signals to the mirrors are updated. In some embodiments, each mirror position is updated every 10 usec to 1 msec. Such a time range is adequate because the drifts and environmental changes that tend to cause light beam misalignment and require mirror position updating have a time scale that is much longer. Different embodiments of the optical cross connect switch system use different methods and structures to supply mirror position feedback.

In some embodiments, such as those shown in FIGS. 1 through 3, the position of the light beams are detected. The signals generated from detecting the positions of the light beams are known as "optical positioning signals." In other embodiments, the positions of the mirrors in the mirror arrays 302, 304 are more directly detected through measuring the positions (translation and angular deflections) of the mirrors. The signals generated from detecting the positions of the mirrors are known as "electrical positioning signals."

In still other embodiments, both the positions of the light beams and the positions of the mirrors are detected to provide combined feedback signals. In various embodiments, single or multiple optical positioning signals, single or multiple electrical positioning signals, or combinations of electrical and optical positioning signals are used to generate coarse and fine position error signals.

Figures 6A, 6B:
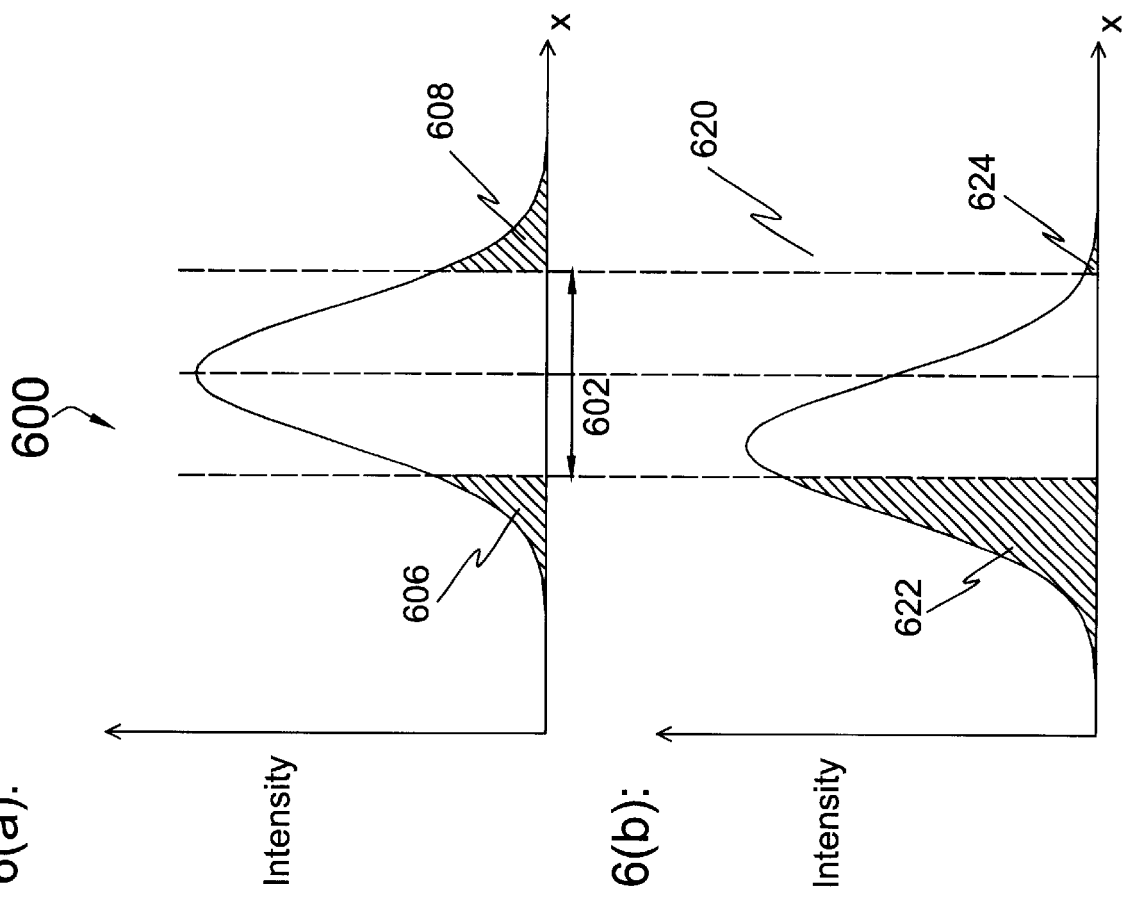
FIGS. 6(a) and 6(b) are plots of the intensity of laser light falling on the outgoing fiber, as a function of distance x, which illustrate the principle of position sensing.

FIGS. 1 through 3 show embodiments that detect light that is not coupled into the outgoing fiber. In FIGS. 1 through 3, the position sensitive detector arrays 110 and 112 are placed in front of the fibers and detect light that has not been directed into the outgoing fiber core. FIGS. 6(a) and 6(b) are plots of the intensity of laser light falling on the outgoing fiber, as a function of distance x. These plots illustrate the principle of position sensing for embodiments including those shown in FIGS. 1 through 3. The plots in FIGS. 6(a) and 6(b) are given only for one dimension x. However, the same principle applies in a second dimension y to provide two-directional positioning feedback. As shown in the plot 600 of FIG. 6(a), the central portion of the light falls onto the core of the fiber 602 and is coupled into the fiber. The shaded regions 606 and 608 indicate light that does not fall onto the core of the fiber 602. This light is lost for data transmission purposes. However, this light is used for position detection. When the two light intensities of shaded regions 606 and 608 are equal, the outgoing light is positioned optimally on the fiber.

FIG. 6(b) is a plot 620 showing a misaligned light beam. When misalignment occurs, the light falling in the two regions 622 and 624 are different. Their difference indicates the amount of misalignment and, when sensed by the position sensor, serves as position error feedback to the servo controller for the closed loop positioning of the light beam.

As seen in plots 600 and 620, this type of position sensing uses only light that would not enter the core of the fiber 602 so it is lost to data transmission anyway. Thus, this type of position sensing does not divert light that would have been collected by the outgoing fiber.

Figure 7:
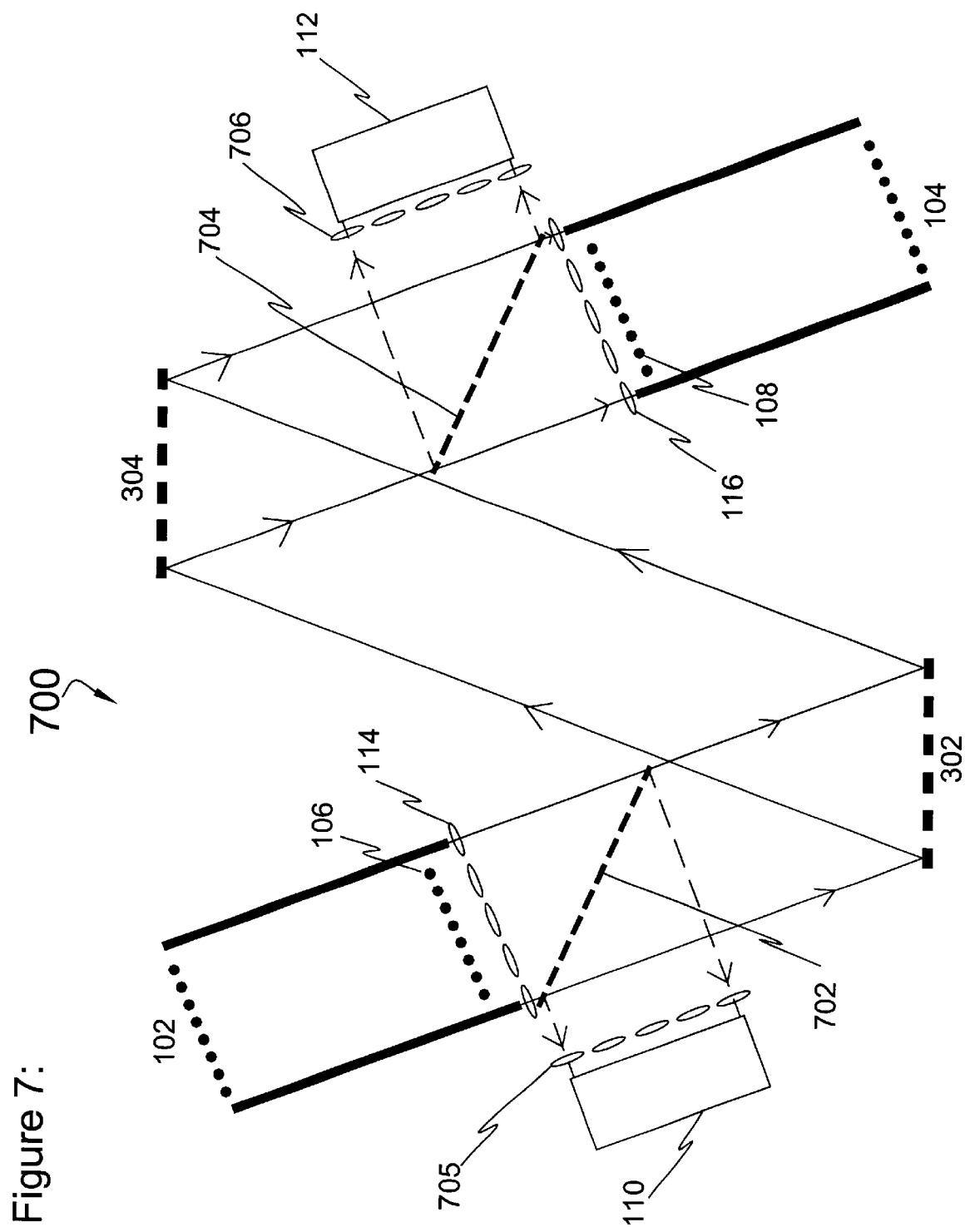
FIG. 7 illustrates an alternative embodiment of an optical cross connect switch.
Figure 8A:
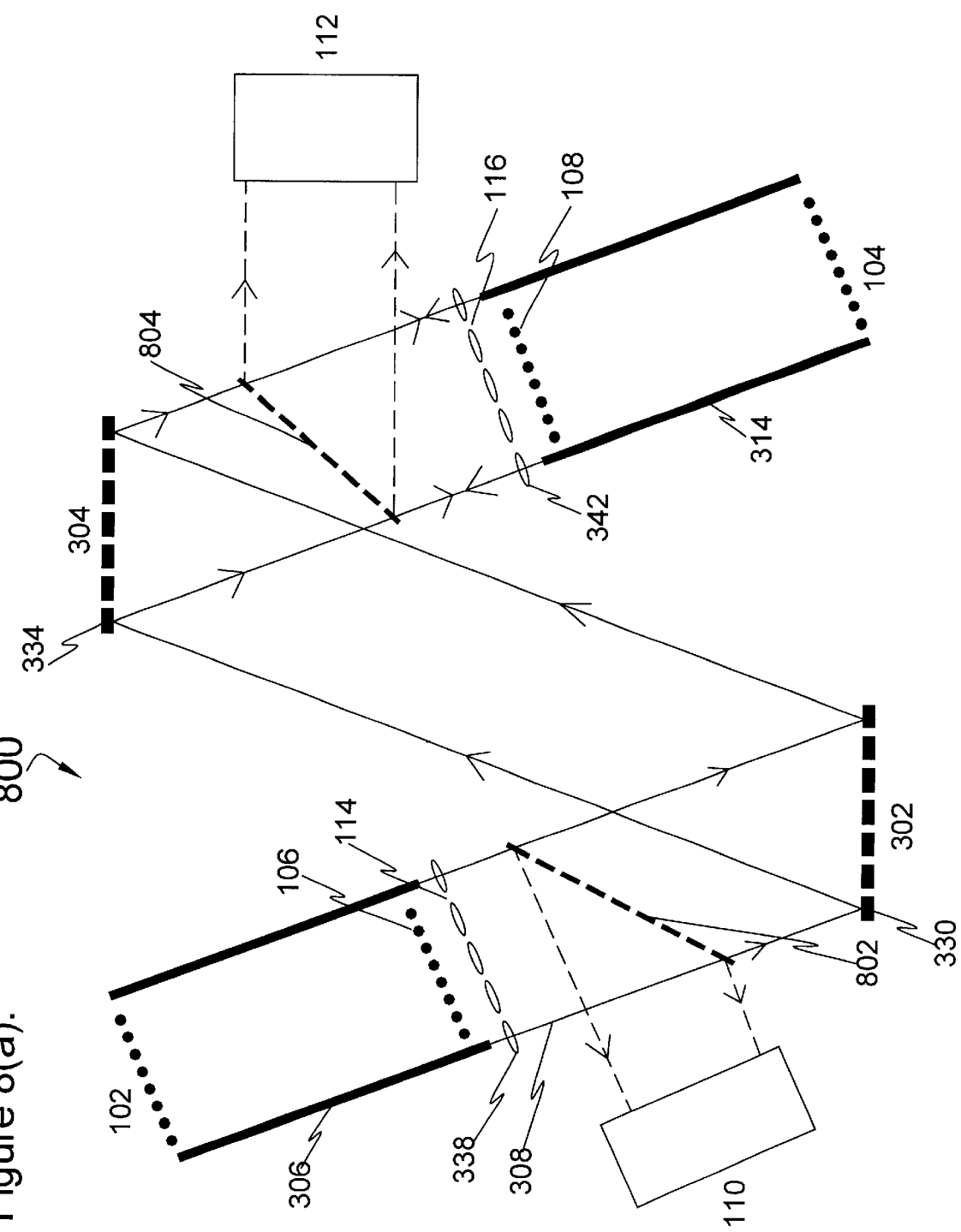
FIG. 8(a) illustrates another embodiment of an optical cross connect switch, where back reflected light is used for position sensing.

In the embodiments shown in FIGS. 1–3, the position sensors are placed directly in front of the outgoing fibers. In other embodiments, position sensors are placed in positions that are not directly in front of the outgoing fibers. FIGS. 7 and 8(a) show embodiments where beamsplitters are positioned in the optical path to capture and redirect a fraction of the light in the optical path. Embodiments with beamsplitters result in the loss of light coupled into the fiber. However, these losses are typically only in a range of about 5% to about 10%.

An alternative embodiment of an optical cross connect switch 700 is illustrated in FIG. 7. In the switch 700 of FIG. 7, instead of placing the position sensing detector arrays 110 and 112 in front of fibers, data or registration light beams are split with beamsplitters 702 and 704 before they enter into lens arrays 114 and 116. The beamsplitters are selected so that they allow high transmission (typically above 95%) while reflection is limited to about 5% range. Position sensing detector arrays 110 and 112 are high spatial resolution sensitive arrays, such as bilateral or quadrant detector arrays or imaging arrays such as charged coupled devices (CCD) or complementary metal oxide semiconductor (CMOS) arrays. These imaging arrays preferably have high sensitivity at monitoring wavelengths in order to minimize insertion losses from placement of the beamsplitter into the optical paths.

For transmission of data from incoming fibers 102 into outgoing fibers 104, only beamsplitter 704 and position sensitive detector array 112 are needed. For reverse transmission, beamsplitter 702 and position sensitive detector array 110 are used. The data or registration light beams that exit from fibers 102 propagate from lens array 114 to mirror arrays 302 and 304 in the manner similar to the way described earlier. After light beams are reflected from the mirror array 304, a small fraction of light is reflected by beamsplitter 704 towards position detector array 112. The remaining light is transmitted toward output lens array 116 and outgoing fibers 104. In some embodiments, the size of the position beams is adjusted to match size and pitch of individual detectors by optional lens arrays 706 and 705 placed in front of position sensitive detector arrays 112 and 110 respectively.

When a registration light signal in visible or near infrared (around 980 nm) wavelength $\lambda$.s is used, silicon based CCD, CMOS, quadrant detectors or bilateral detectors are appropriate choices for position sensitive detectors. When data light at standard optical communication wavelengths (1290–1610 nm) is used for position sensing, these detector arrays are typically based on InGaAs, GaAs, Ge or other infrared photosensitive materials.

In embodiments that include a beamsplitter and position sensing detectors outside the normal optical path between incoming and outgoing fibers, as well as embodiments where the position sensing detectors are in front of the fibers, positioning calibration of detectors is performed with respect to the center cores of optical fibers. The calibration is done by measuring the light intensity that reaches the outgoing fibers. When the light intensity is at its maximum, the two dimensional light beam positions on position sensitive detectors are recorded. This provides initial reference mirror positions that result in the maximum light intensity coupled into the outgoing fibers.

With embodiments where the position sensors are not in front of fibers, determination of reference positions of mirrors and reference positions of position sensitive detectors is done at the same time. The reference position of position sensors is recorded when reference position of mirrors is determined with maximized light intensity coupled into outgoing fibers. The pairs of mirrors from mirror arrays 302 and 304 are moved in small incremental rotational steps while the light intensity coupled into a selected fiber is continuously monitored. When the maximum light intensity is reached, reference mirror position is recorded in terms of two voltages required to attain the optimum position of mirror pair. At the same time, two coordinates representing the position of beamsplitted light beam on the position sensitive detector 112 is recorded.

Yet another embodiment of an optical cross connect switch 800 is illustrated in FIG. 8(a). In this embodiment, the fiber array surface is covered by a highly reflective surface having openings over the core of fibers. In one embodiment, the pattern of apertures that are positioned over fiber cores is created without photomasking as follows. The completed fiber array with properly terminated fiber ends (this may include plane polishing, angled polishing, laser cutting and polishing and antireflective coatings) is coated with photoresist. Both incoming fibers and outgoing fibers are integrated into the fiber alignment structure so that the fiber ends and the surrounding surface form a continuous plane. All fibers in the array are illuminated from the opposite end with ultraviolet light that provides exposure of photoresist. Subsequently, photoresist is developed and removed from unexposed areas, leaving photoresist covering only the fiber cores. In the next step, a reflective metal film is deposited by sputtering or evaporation over the whole fiber array assembly. In the final step, the photoresist is removed which lifts off the metal covering the fiber cores. This approach provides apertures in the reflective metal coating over the fiber cores without using any photomasking operations.

Figure 8B:
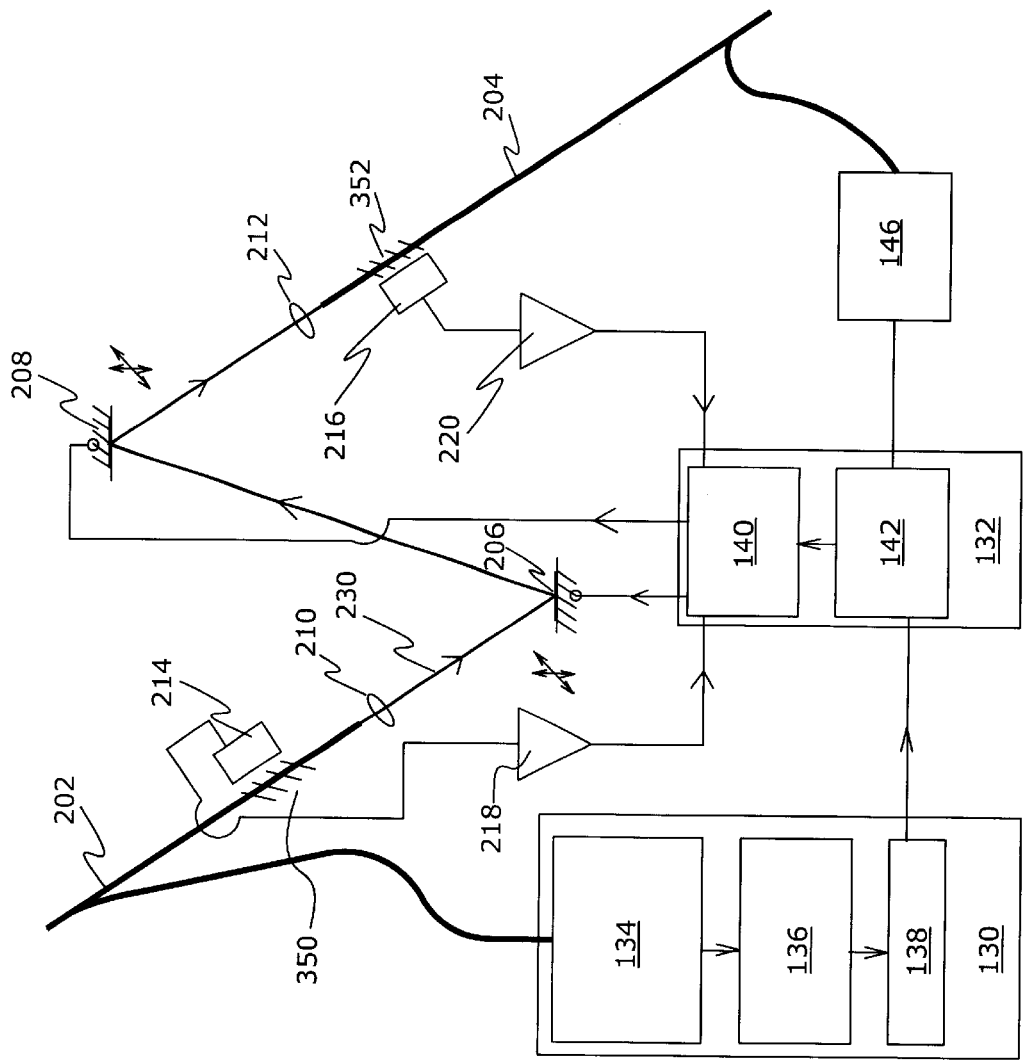
FIG. 8(b) illustrates an embodiment of an optical cross connect switch where the intensity of light coupled into the outgoing fiber is directly measured.

In the switch 800 of FIG. 8(*a*), light beams are split with beamsplitters 802 and 804. However, in this case, the light beams travel from the incoming fibers, are reflected off the two mirror arrays 302 and 304, travel to the outgoing fibers and are back reflected from the reflective surface on the outgoing fibers. Light falling onto fiber cores is not reflected. The back reflected light from the outgoing fibers is split by the beamsplitter 802 or 804 onto position sensitive array 110 or 112. The beamsplitters 802, 804 transmit more than 95% of the light. When the light is aligned onto the fiber core, minimum light intensity is back reflected toward beamsplitters 802 or 804 and then onto position sensitive arrays 110 and 112. The lowest light intensity on the imaging array and two dimensional location of the residual signal on the position sensitive arrays 110 and 112 are indicators of good alignment. When light is misaligned from the fiber core, either in the x or y directions, higher light intensity is detected on the position sensitive arrays 110 and 112, and the intensity, shape and position of the back reflected beam provides position error signals.

The position sensitive arrays 110 and 112 are typically imaging arrays of charge coupled devices with a large number of imaging pixels. The ratio of number of imaging pixels to number of fibers is typically about 1000 to 4000. This ratio means that an array of about 30 by 30 to 60 by 60 of detectors is available to image position of directly beam-splitted light or back reflected light from each individual fiber. In the wavelength range of 1300–1600 nm, charge coupled devices are based on InGaAs materials, while in 800–950 nm range more conventional silicon based charge coupled devices are used.

For example, beam of light 308 leaves incoming fiber 306, is collimated by lens 338, and is reflected off mirrors 330 and 334. Then the light beam 308 is focused by lens 342. The part of the focused light beam 308 that does not enter the core of the outgoing fiber 314 is reflected from the reflecting surface that surrounds the core of the outgoing fiber 314. This reflected light returns to beamsplitter 804, where it is split and sent to the position sensitive detector array 112. In some embodiments, light is focused with a lens in a lens array (not shown) positioned between the beamsplitter 804 and the position sensitive detector array 112. The position sensitive detector array 112 detects the position of the light beam 308 and provides feedback to the system controller 132.

When bilateral and quadrant position sensitive detectors are used in the position sensitive detector arrays 110 and 112 in FIG. 8(*a*), apparent beam positioning is obtained and corrections are applied to determine actual positions. When imaging arrays are used, an image of the aperture around the fiber core and back reflected light are both recorded in the image. This embodiment provides the advantage that both fiber cores and light beams are imaged, and therefore, no referencing calibration is needed.

FIGS. 1 through 3, 7, and 8(*a*) show embodiments where the detected light is light that is not coupled into the outgoing fiber. FIG. 8(*b*) illustrates another embodiment of an optical cross connect switching system 200, where the position sensitive detectors 214 and 216 detect the intensity of light 230 that has been coupled into the outgoing fiber 204. This provides a direct measure of the alignment of the light beam 230 with the outgoing fiber 204. The optimum alignment results in maximum measured light intensity. Misalignments in either x or y directions lead to a decrease of light intensity coupled into the fiber 204.

Light 230 from incoming fiber 202 is to be directed to outgoing fiber 204. Light beam 230 is collimated with lens 210, reflected from mirror 206, reflected from mirror 208, then focused by lens 212 into outgoing fiber 204. A portion of the light 230 that enters the outgoing fiber 204 is split by splitter 352 and sent to a photodetector 216. The signal generated by the photodetector 216 is amplified by amplifier 220 and sent as feedback to the system controller 132. Thus, the photodetectors 216 in the embodiment shown in FIG. 8(*b*) detect the intensity of light 230 that has actually been coupled into the outgoing fiber 204.

To determine the positions of the mirrors 206, 208 that provides maximum light into the outgoing fiber, the mirror positions are slightly moved (dithered). As the mirrors 206, 208 are moved, the measured light intensity is tracked. This allows discovery of the mirror position that provides maximum light into the outgoing fiber 204.

In embodiments with highly sensitive photodetectors 214, 216, the mirrors 206, 208 are minutely dithered in both directions to identify the direction of alignment and which deflection angle to adjust. These mirror deflections are small enough so they do not significantly increase error rates in the transmitted data. In some of these embodiments, the direct measurement is the only mirror positioning feedback signal used to position the mirror.

In embodiments with less sensitive photodetectors 214, 216, the direct measure of alignment of the light beam is a supplementary mirror positioning feedback signal, used in addition to other feedback. In these embodiments, the direct measurement is used for fine positioning of the mirrors 206, 208. Other feedback signals are used to coarsely position the mirrors 206, 208 approximately correctly.

In embodiments where the photodetectors 214, 216 are highly sensitive, as well as embodiments where the photodetectors 214, 216 are less sensitive, only a small fraction of the light in the fiber is split and detected, in order to avoid increasing transmission errors. There are multiple ways to split the small fraction of light from the fiber. In the embodiment shown in FIG. 8(*b*), diffraction gratings 350 and 352 are induced in the fiber core. The diffraction gratings 350 and 352 permit several percent of light to be diverted out of the fiber and detected with photodetectors 214, 216. The photodetectors 214, 216 generate an electrical signal, which is amplified with amplifiers 218 and 220. The electrical signal is sent to the system controller 132, which uses the signal to define the position error. In some embodiments, the signal from the direct measurement of light in the outgoing fiber is processed in conjunction with signals from imaging arrays or other electrical positioning signals, so that two position error signals are used.

Additional embodiments use other approaches for beam splitting of light in the fiber. In one embodiment, the fiber is cut and a small gap is formed in the outgoing fiber. The light leaves the fiber on one side of the gap. On the other side of the gap, most of the light reenters the fiber, but a small amount of light is reflected out. In another embodiment, a diffraction grating reflects a small amount of light into another fiber that guides the diffracted light into a photodetector. In another embodiment, twisted fibers are used. In yet another embodiment, a separate beam splitter is used. The light exits from the fiber. Then the light is collimated and directed to a beam splitter. A small fraction of the light is reflected toward a collection lens that couples this light into a detection fiber or photodetector. Most of light is transmitted onto outgoing lens and propagating fiber. In a final embodiment, the light is coupled into a waveguide. A small amount of light is beam split into the second leg of the waveguide. The two signals are then coupled back into fibers. The intensity of the small amount of light beam split into the second leg of waveguide is measured by a photodetector.

Figures 9A, 9B:
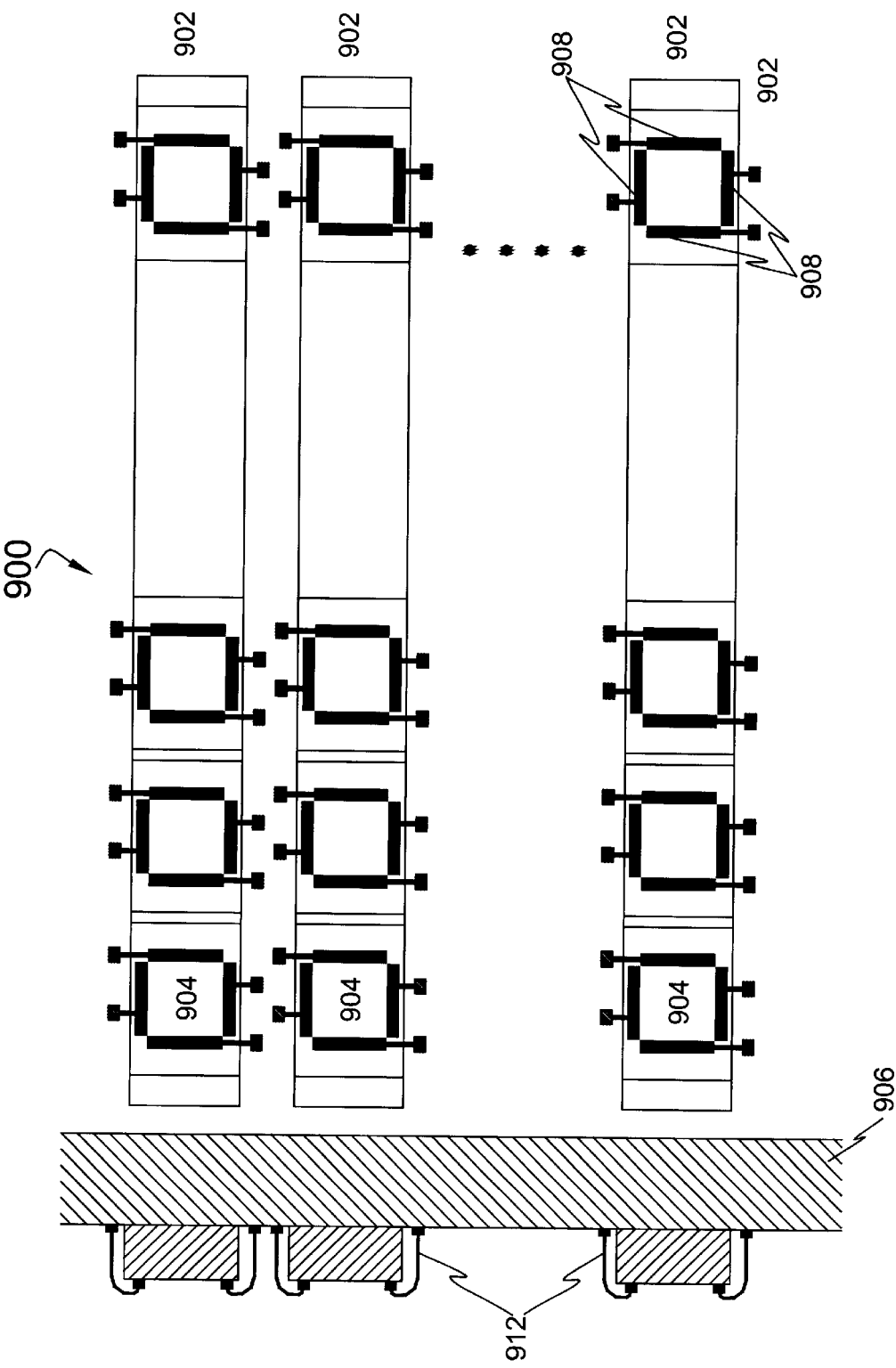
FIGS. 9(a) and 9(b) illustrate one embodiment of a position sensing array with bilateral position sensitive detectors.

FIGS. 9(a) and 9(b) illustrate one embodiment of a position sensing detector array 900 with bilateral sensors. FIG. 9(a) represents the top view while FIG. 9(b) is the side view of the array. The embodiment illustrated in FIGS. 9(a) and 9(b) is applied in cases where the position sensing photodetector arrays are not directly in front of the fibers, such as the embodiments shown in FIGS. 7 and 8(a). In these embodiments, there is space behind the position sensing arrays available for electrical leads and integrated circuits that amplify the signals. The position sensing photodetector array 900 shown in FIGS. 9(a) and 9(b) is based on rows 902 of position detectors 904 that are attached to a chip 906 that includes integrated circuits that provide amplification of photocurrent and signal multiplexing. Each position sensor 904 has four electrodes 908. Electrical leads 912 connect the electrodes 908 to integrated circuit amplifiers on chip 906. The light beam that impinges onto the photosensitive surface leads to generation of photocurrent that flows toward all four electrodes 908. The relative magnitudes of the four currents through the electrodes 908 correspond to where the beam is located on the photosensitive surface, and provides the x and y position of the light beam. The photodetector's sensitive area is smaller than the pitch between mirrors or fibers in order to accommodate all electrical leads.

FIGS. 10(a), 10(b) and 10(c) illustrate another embodiment of a position sensitive detector array 1000 suitable for use with the systems shown in FIGS. 1–3, where the position sensitive array is placed directly in front of or even in contact with the fiber array. Fiber array 1001 has cladding regions 1015 and core regions 1014. The position sensitive detectors 1010 are placed on the face of fiber array. The light is coupled into the fibers with lens array 1003.

Detailed front and side views of the single quadrant photodetector 1010 that is used in some embodiments where the position sensitive detector array is in front of the fiber array are shown in FIGS. 10(b) and 10(c), respectively. The detector 1010 is divided into four quadrants 1002, 1004, 1006 and 1008. Each quadrant contains a separate detector such as a photosensitive p-n junction or photosensitive pin diode 1012. Each of these detectors 1002, 1004, 1006 and 1008 covers about a 90 degree region. The detectors do not cover the center of the fiber over an area that corresponds to the core of the fiber 1014. This area contains material that is transparent at the operational wavelength or an opening without any material. Consequently, this embodiment is suitable for use with the embodiment shown in FIGS. 1–3. The cross section of an embodiment of a pin diode 1012 is shown in FIG. 10(c). The electrode 1016 is a common electrode and the four detector regions 1002–1008 provide four separate signals into four single ended or two differential amplifiers.

In some embodiments, quadrant photodetectors in FIG. 10 are substituted by bilateral detectors similar to those described above in FIG. 9. When bilateral sensor arrays are placed in front of fibers, then one sensor with an opening over the core of the fiber is used. The sensor has four electrodes positioned on the outside edges of a photosensitive multilayer structure as in FIG. 9 above. Signals collected from these four electrodes reflect the two directional position of the light beam.

Figures 11A, 11B:
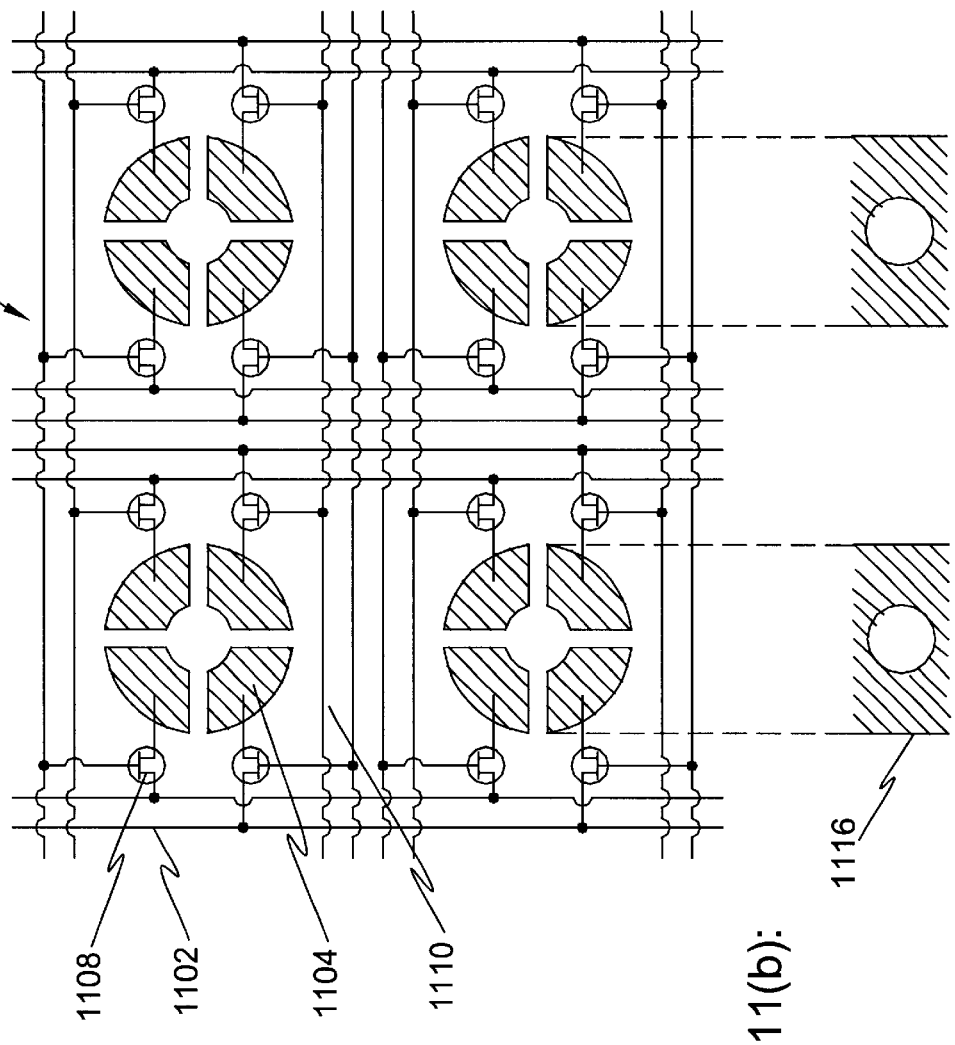
FIGS. 11 (a) and 11 (b) illustrate electrical lead interconnects for large photodetector arrays.

FIGS. 11(a) and 11(b) illustrate electrical lead interconnects 1100 for large position sensitive detector arrays. The interconnects 1100 shown in FIGS. 11(a) and 11(b) allow large numbers of leads to be accommodated, even when there is little space available between the sensors. The interconnects 1100 also allow fast readout of the sensors in the array. This is done by performing a matrix readout row by row (or column by column). This allows readout of one complete row at a time. The implementation shown in FIG. 11 is illustrated with an array of quadrant detectors 1104. Front electrode column leads 1102 and row leads 110 are connected to transistors 1108. The signals applied to the row leads 1110 select one row at the time that is being read out. The signals that appear on columns correspond to positions of light beams in that specific row. During the next readout period, the next row is addressed and read out. All detectors have the same common ground electrode 1116, shown in FIG. 11(b). The configuration of this ground electrode is the same as shown in cross section in FIG. 10(c). For embodiments where the common electrode 1116 is metal, the common electrode 1116 has openings for light passing into fibers. In some embodiments, where a transparent electrode such as indium-tin oxide film is used, the common electrode 1116 is continuous. Signals from these photodetectors 1104 are fed into amplifiers to generate two sets of feedback signals that are fed into the servo controller. In response to the feedback signals, the system controller 132 controls the positioning and alignment of all mirrors in the mirror array to align the light beam onto the core of fibers in two directions and maintains the alignment until instruction is received to change the configuration.

Figures 12A, 12B:
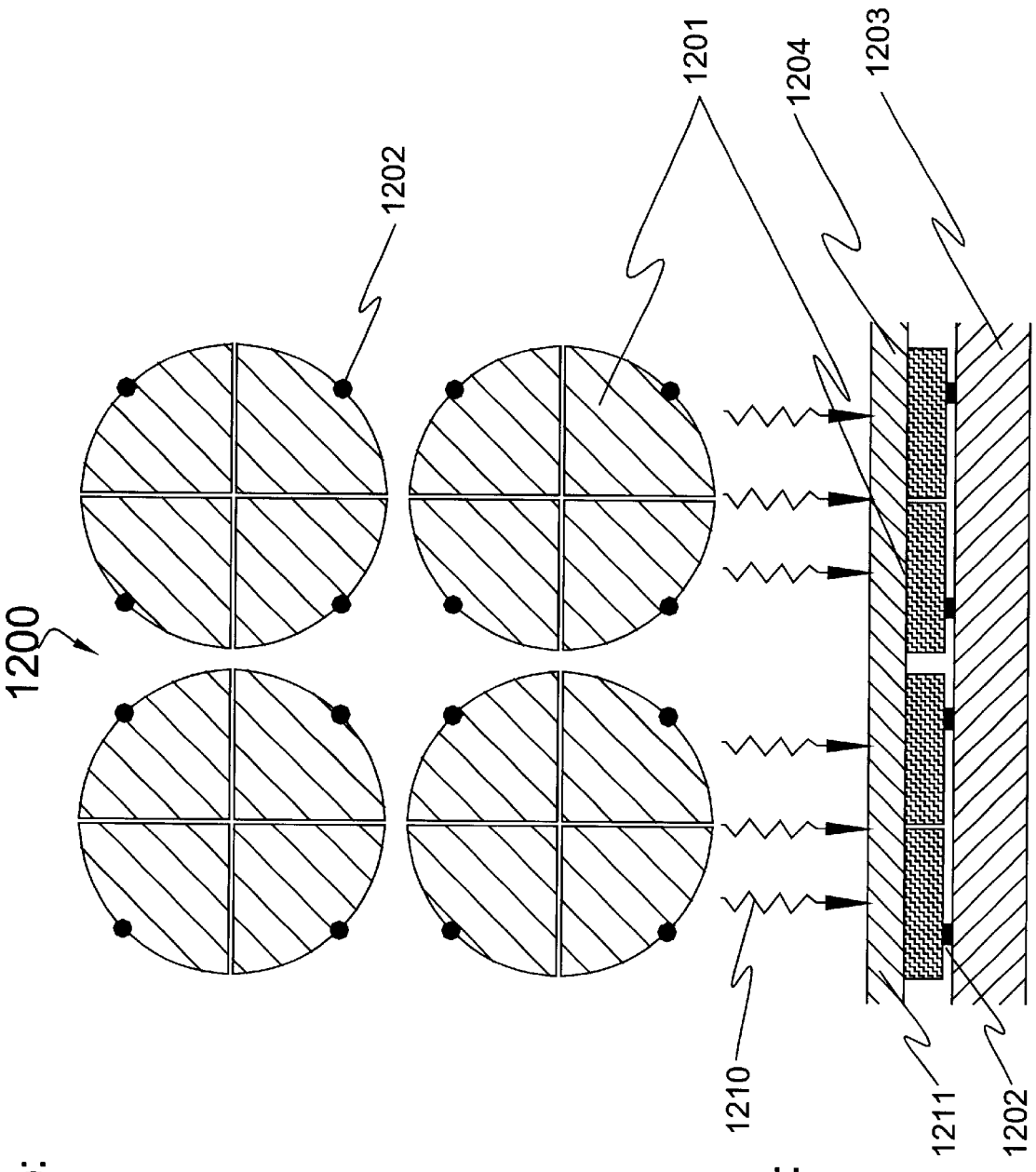
FIGS. 12(a) and 12(b) illustrate a quadrant photodetector array.

FIGS. 12(a) and 12(b) illustrate another configuration of position sensitive detector array 1200. In the previous described embodiments, the illuminated surface and non-ground electrodes are on the same surface (so called front side illumination). In the embodiment of FIG. 12, illuminated surface 1211 and non-ground electrodes 1202 are on the opposite sides (so called back side illumination). Light beams 1210 impinge on the substrate 1204 of position sensitive detector array. In this case, the substrate 1204 is relatively thin and does not significantly absorb the light. Most of light reaches the p-n junctions of quadrant photodetectors 1201 where photogenerated carriers are formed. The electrodes 1202 provide electrical path for carriers to amplifiers that reside in layer 1203. This quadrant photodetector 1201 generates again two dimensional position sensitive signals. In some embodiments, the photodetector array 1200 is placed directly over a substrate 1203 containing amplifiers and processing electronics. This configuration of detectors is well suited for architecture described in FIGS. 7 and 8.

Figures 13A, 13B:
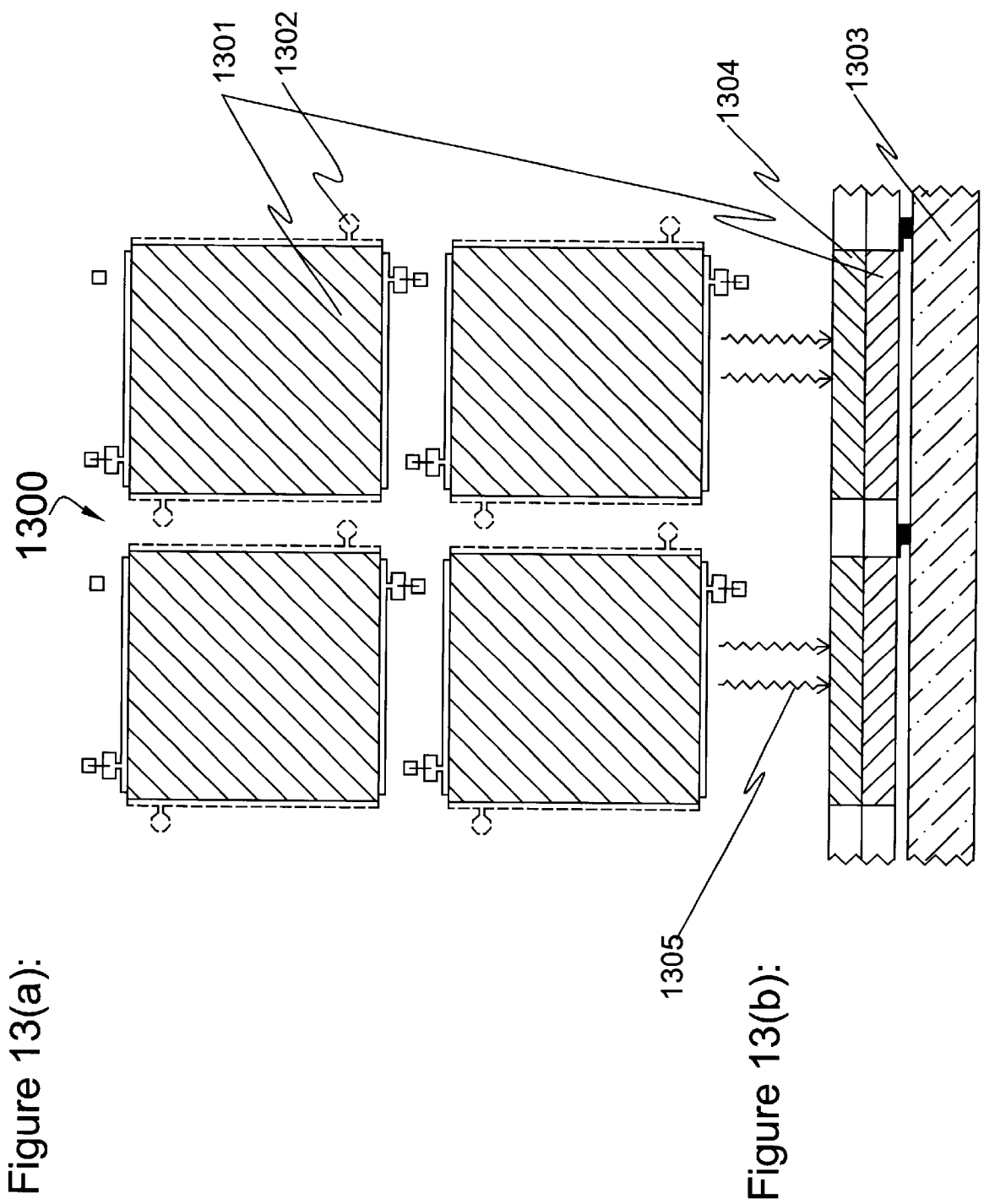
FIGS. 13(a) and 13(b) illustrate a bi-lateral photodetector array.

FIGS. 13(a) and 13(b) illustrate another backside illumination architecture of position sensitive detectors with bi-lateral photodetector array 1300. The bi-lateral photodetectors 1301 generate two dimensional position sensitive signals. Each photodetector 1301 has four electrodes 1302. Light beams 1305 impinge on the backside of array 1300. The electrodes 1302 connect the photodetectors 1301 to the substrate 1303 with amplifier electronics. This embodiment is also well suited to the systems described in FIG. 7 and 8(a).

In some embodiments, imaging CCD or CMOS arrays are used for beam positioning instead of quadrant or bi-lateral arrays in the locations for the position sensor arrays shown in FIGS. 7 and 8(a). Readout of the CCD or CMOS array provides data to servo control.

Figure 16:
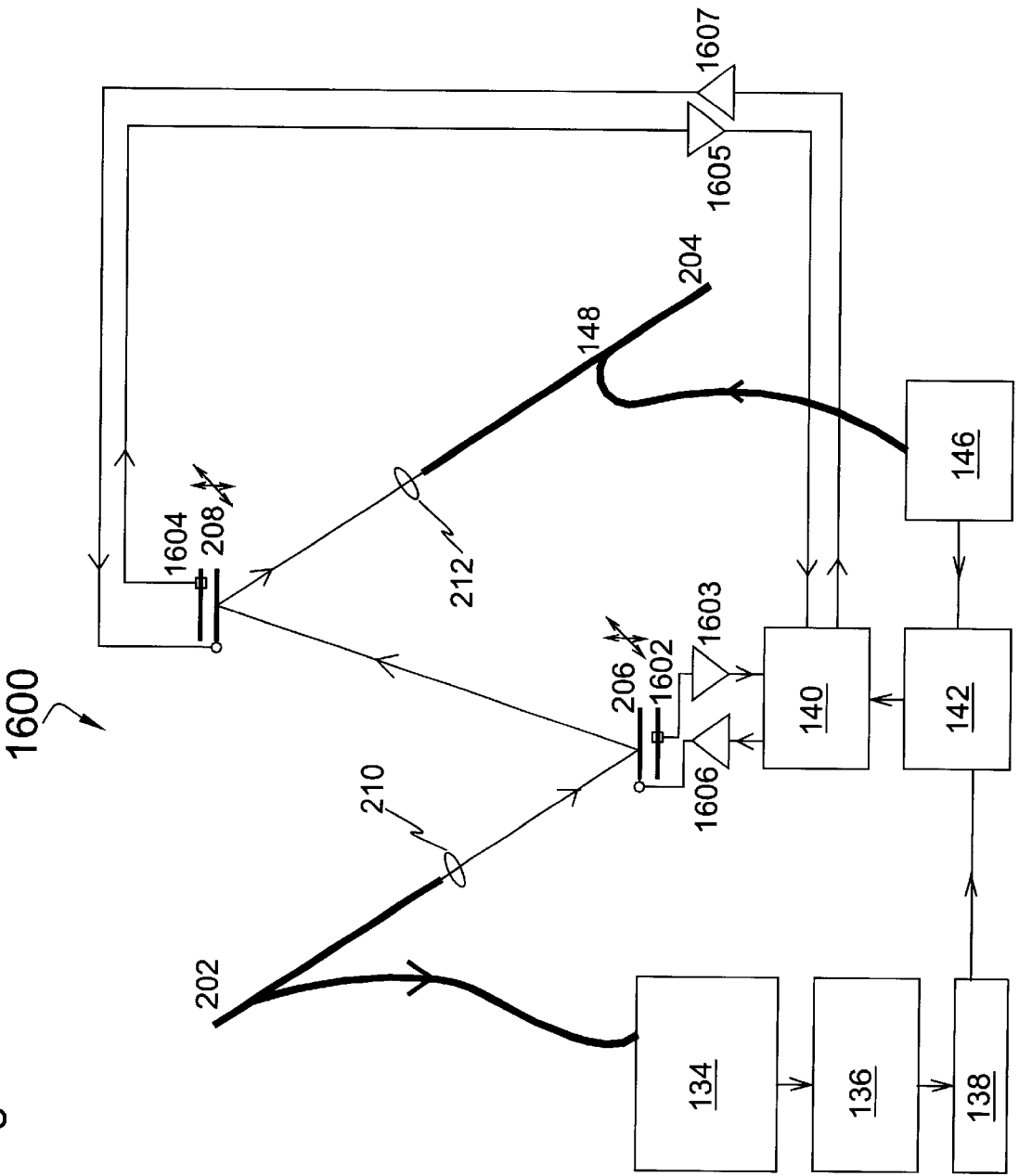
FIG. 16 illustrates an embodiment of an optical cross connect switching system that detects two directional position of the mirrors using capacitance measurements.

FIG. 16 illustrates an embodiment of an optical cross connect switching system 1600 which includes capacitance sensors 1602, 1604 to detect the position of the mirrors 206, 208 rather than optical sensors to detect light directed at the outgoing fibers. Capacitance sensors 1602, 1604 are a type of electrical position sensing detectors. The system 1600 includes driving amplifiers 1606 and 1607 that supply high voltages to deflect the mirrors 206, 208. Each parallel plate or rotational comb-type electrostatic two-axes mirror actuator forms four separate capacitors between the four fixed electrodes of the actuator and the common ground electrode. These four measured capacitances indicate the translations and angular deflection angles of the mirror and inner frame. As the position of the mirror and inner frame changes, the distance and the angle between the movable and fixed capacitor plates changes, and therefore, the capacitance also changes. This capacitance is measured and used to determine the two deflection angles and translation of the mirror. High voltage, high frequency alternating voltage is applied between the fixed and moving electrodes in order to measure capacitance at high sampling rates. High frequency signals create large impedance changes that are proportional to frequency. High frequency signals are also desirable since they do not cause any detectable physical motion in the mirror and the inner frame. Alternating current detection provides narrow bandwidth and phase sensitive measurement that yields high signal-to-noise ratio and, consequently, high position sensitivity. The servo system 140 provides high frequency voltages to these capacitance sensors 1602 and 1608, which generate alternating currents that are amplified with amplifiers 1603 and 1605 and detected in servo electronics 140. These signals output from the capacitance sensors 1602, 1604 are electrical positioning signals for closed loop servo control.

The electrical position sensing detectors in FIG. 16 provide continuous electrical positioning signals during switch reconfiguration. The relationship between electrical positioning signals and beam positions is established by calibration. Light coupled into the fiber is monitored as a function of mirror angular deflection as tracked by electrical positioning signals. During switch reconfiguration the optical position sensitive detectors in some embodiments do not provide continuous positioning signals during switch. Positioning signal gaps exist between adjacent optical position sensitive detectors and no optical signal is available when the light beam crosses these gaps. In addition, when a large number of light beams are switched at the same time, it can be difficult to distinguishing between different beams. The solution in such embodiments is to combine electrical and optical positioning detectors to combine the advantages offered by the individual detection schemes.

Figure 17:
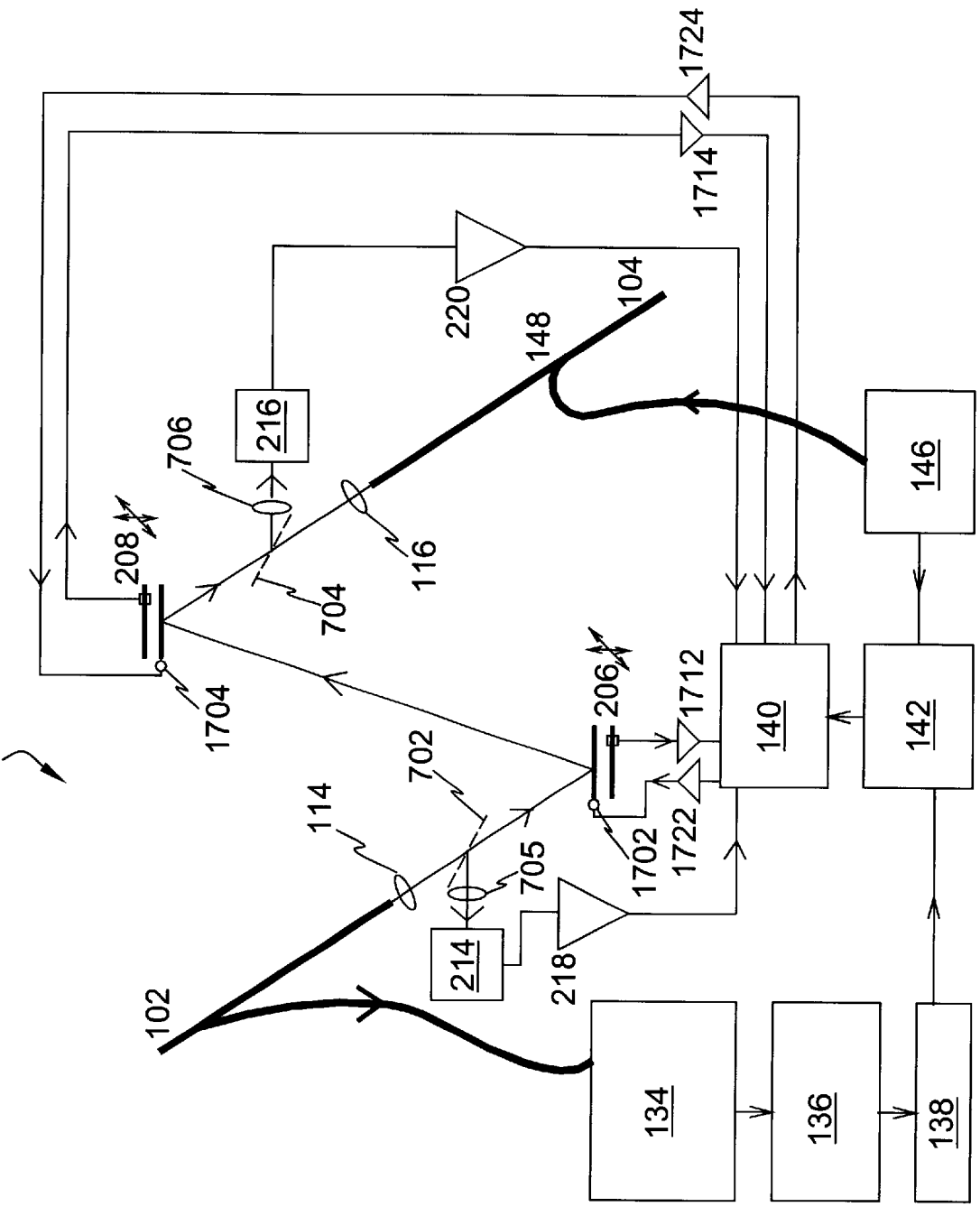
FIG. 17 illustrates an embodiment of an optical cross connect switching system that detects two directional position of the mirrors using capacitance signals in addition to two directional detection of light beams.

FIG. 17 illustrates another embodiment of an optical cross connect switching system 1700. The embodiment of FIG. 17 is similar to the embodiment shown in FIG. 7. However, in the embodiment of FIG. 17, both electrical and optical positioning detectors are used. Optical positioning sensors 214 and 216 detect signals that have been split off by beamsplitters 702, 704 and provide two directional position data. In addition, electrical position detectors detect the position of the mirrors 206, 208. In the embodiment shown in FIG. 17, piezoresistive sensors 1702, 1704 detect the position of the mirrors 206, 208 instead of the capacitance sensors described in FIG. 16. In this embodiment, piezoresistive elements 1702 and 1704 are placed on the hinges of the mirrors 206, 208 and the inner frames 408 of the mirrors 206, 208. Consequently, two directional electrical positioning signals are generated in addition to two directional optical signals. When the mirrors 206 and 208 are deflected, these deflections introduce strains in the hinges and in materials that are deposited on the hinges. The hinges are coated with piezoresistive films. Alternatively, piezoresistive elements are formed by implantation of dopants into silicon. The change of resistance of the piezoresistive film or elements is directly proportional to the strain and consequently directly proportional to the deflection angle of the mirror. Thus, measuring the resistance provides a measurement of the mirror 206, 208 position.

At least one piezoresistive element is used per set of mirror hinges. For example, one element is used on the inner hinges and one element on the outer hinges. More sensitive embodiments use two or four sensing elements for a given deflection direction. In some embodiments with multiple sensing elements for a deflection direction, each set of two or four sensors is connected in potentiometer or Wheatstone bridge configurations to measure the mirror deflections with high sensitivity.

The mirrors 206, 208 in the optical cross connect switching system 1700 of FIG. 17 are similar to the mirror system 400 described in FIG. 4. However, the mirror system 1700 of FIG. 17 includes piezoresistive elements 1702 and 1704 and associated circuitry. The piezoresistive elements 1702 and 1704 are located on the hinges 404, 406 of the mirrors 206, 208 in the cross connect switching system 1700. In operation, the driving amplifiers 1722 and 1724 supply high voltages to deflect the mirror surfaces 402 and inner frames 408 of mirrors 206, 208. The piezoresistive elements 1702, 1704 detect the deflections of the hinges 404, 406 of mirrors 206, 208. This generates the feedback signals that are sent to amplifiers 1712 and 1714 and then the servo controller 140.

Figure 18:
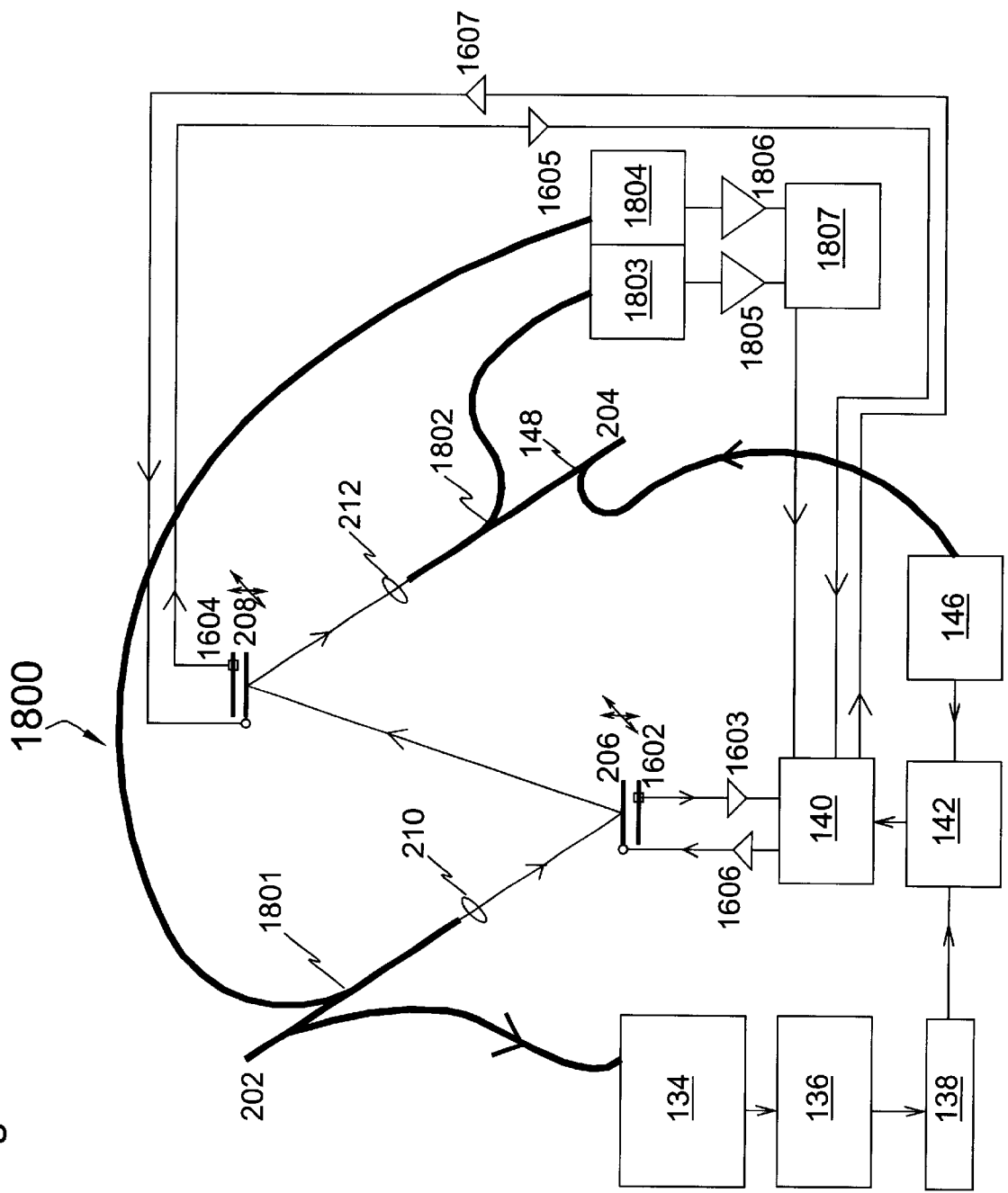
FIG. 18 illustrates an embodiment of an optical cross connect switching system that detects two directional position of the mirrors with piezoresistive sensors in addition to detection of intensity of light beams coupled into fibers.

Similarly, FIG. 18 illustrates another embodiment of an optical cross connect switching system 1800 that uses both electrical and optical positioning. The optical cross connect switching system 1800 of FIG. 18 has capacitance sensors 1602, 1604, similar to the optical cross connect switching system 1600 of FIG. 16. The optical cross connect switching system 1800 of FIG. 18 includes capacitance sensing for two directional electrical position sensitive detection. In addition to the capacitance sensing, the optical position detection is based on monitoring of light coupled into outgoing fibers, as described with respect to FIG. 8(*b*). As in FIG. 8(*b*), the optical cross connect switching system 1800 includes splitters 1801 and 1802, which split some of the light received at the outgoing fibers and directs that light to photodetectors 1803–1804. The signals from the photodetectors 1803, 1804 are sent to amplifiers 1805–1806 and then multiplexer/digital converter 1807. The multiplexer/digital converter 1807 then feeds the optical intensity feedback data to the servo controller 140. In some embodiments, the capacitance sensors 1602, 1604 provide feedback for the coarse positioning of the mirrors 206, 208. Then the photodetectors 1803, 1804, through sensing the maximum light coupled into the fiber, provide feedback for fine positioning of the mirrors 206, 208.

The architectures in FIGS. 16–18 are shown for a single incoming and a single outgoing fiber and corresponding optical and electrical components. It should be understood that these fibers and components represent arrays of these devices as above.

As discussed above, some embodiments of the optical cross connect switching system use one or more optical positioning signals for mirror positioning. Some embodiments use one or more electrical positioning signals. And yet other embodiments combine the mirror position monitoring (electrical positioning signals) with optical positioning signals. For example, in the embodiment of FIG. 18, electrical positioning signals are used to coarsely position the mirrors to approximately the correct deflections. Then optical positioning signals are used to finely position the mirrors to the optimum position.

Another embodiment of the optical cross connect switch system uses multiple optical positioning signals to provide mirror positioning feedback. Optical coarse position detection is done with imaging arrays, as described with respect to FIG. 8(a). Fine position detection is provided by direct detection of the light intensity that has entered the fiber core, as described with respect to FIG. 8(b).

In one embodiment that combines electrical positioning signals with optical positioning signals, electrical signals from piezoresistive elements or capacitors that detect mirror position are coarse position error signals. The position of the mirrors, detected by the piezoresistors or capacitors as shown with respect to FIGS. 16–18, are used to coarsely position the light beams over the outgoing fibers. Then, fine position error signal is generated by direct measurement of light coupled into the fiber, as described with respect to FIG. 18.

Figure 19:
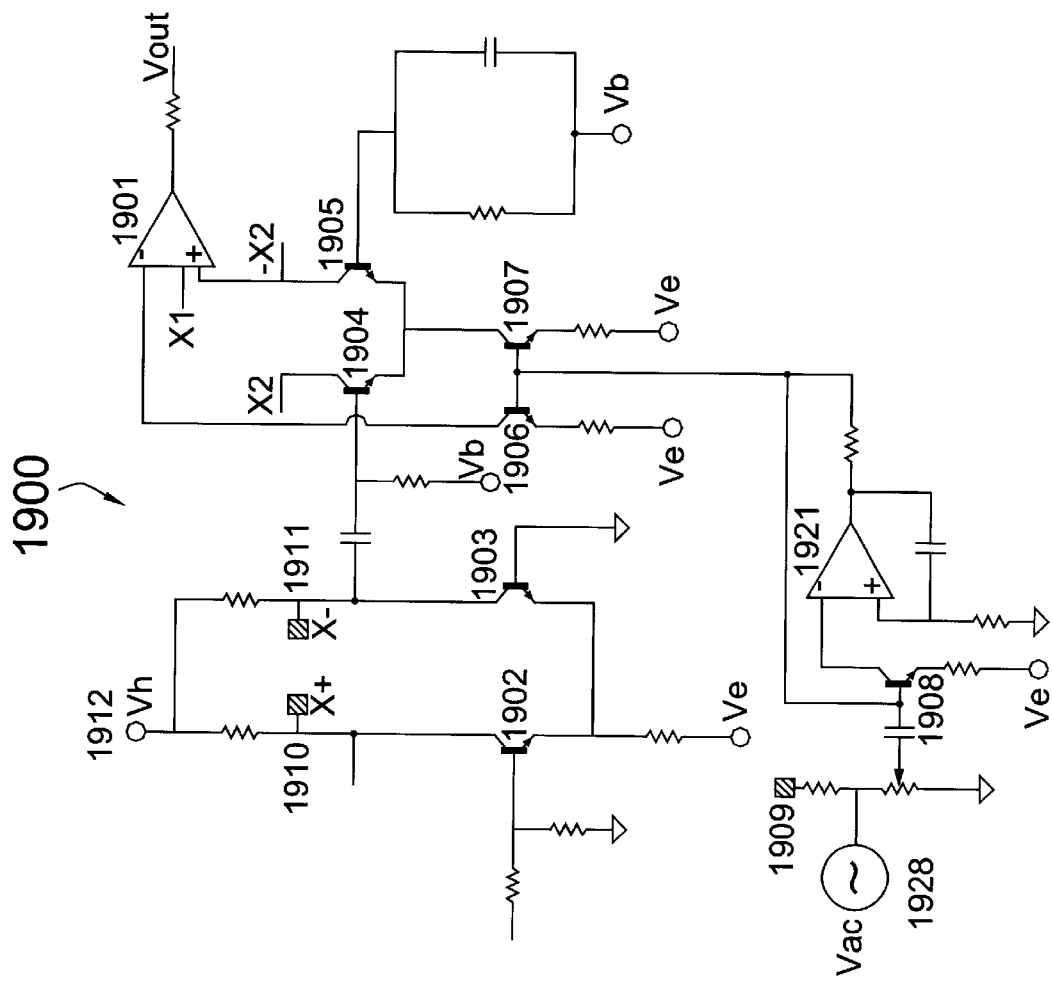
FIG. 19 illustrates principle of capacitance detection of mirror positions.

FIG. 19 is a diagram detailing one embodiment of capacitance detection circuitry 1900. The circuitry for measurement of capacitance associated with rotation of the mirror in one direction comprise a subtracting amplifier 1901, an amplifier 1921, switching transistors 1902–1908, an ac wavefront generator 1928, a movable electrode 1909, two fixed electrodes 1910 and 1911 and high voltage power supply 1912. A high voltage driving signal is applied between one fixed electrode, 1910 or 1911, and the movable electrode 1909, which is kept at ground together with the other fixed electrode, 1911 or 1910. Ac voltage is superimposed on the driven fixed electrode 1910 or 1911. The signals associated with the change of capacitance appear at transistor switches 1907 and 1906, and their difference is fed into subtracting amplifier 1901. The output from subtracting amplifier 1901 represents the change of capacitance associated with rotation in one direction. A similar circuit is used to detect the change of capacitance associated with rotation in another direction. A third circuit generates a signal associated with a capacitance change due to translation of all four electrodes. The dependence between capacitances and rotational angles is calibrated to permit conversion of measured capacitance changes to rotational angles.

Figure 20:
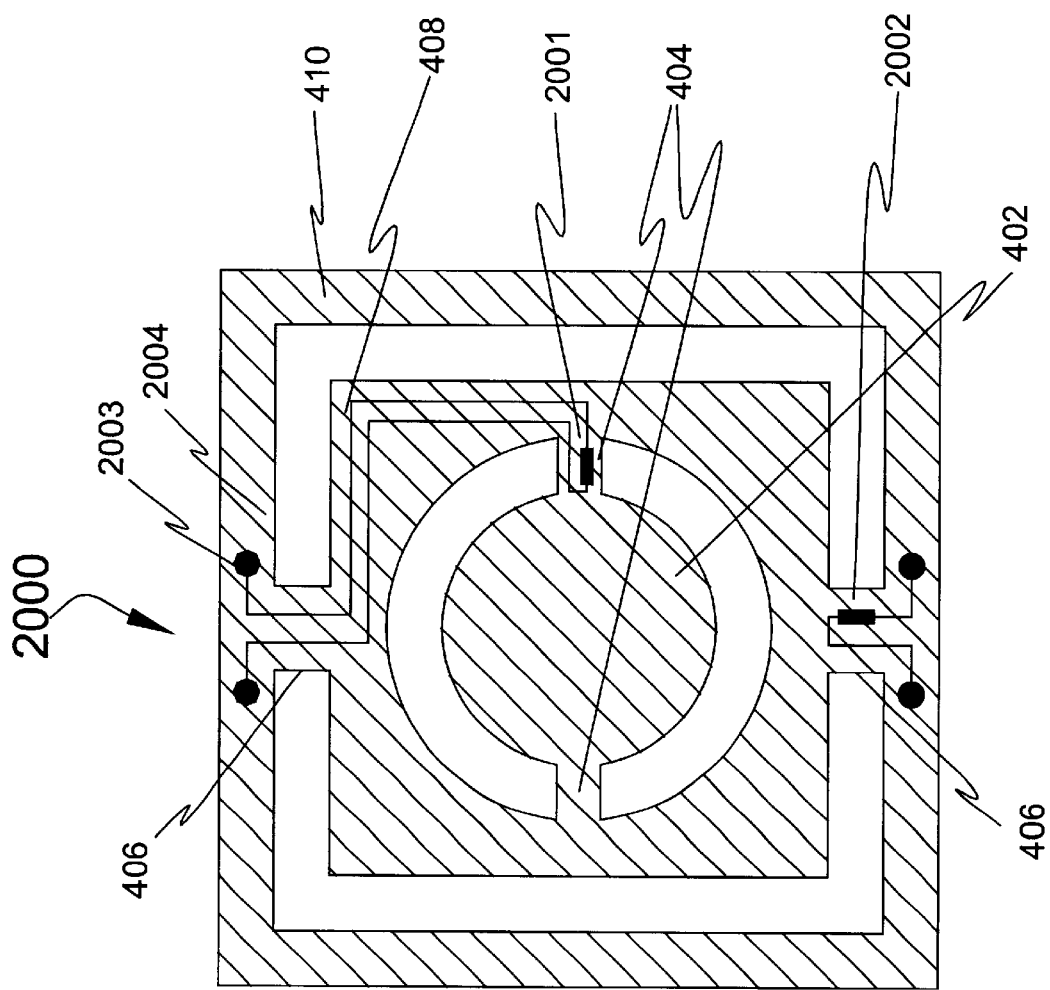
FIG. 20 illustrates one implementation of piezoresistive sensors for detection of mirror positions.

FIG. 20 shows details of one embodiment of a mirror system 2000 with piezoresistive sensors used to determine the translation and angles of deflection of a parallel plate mirror actuator. The actuator shown in FIG. 20 is similar to the actuator of FIG. 4, but with the addition of piezoresistive sensors. One piezoresistive element 2001 is placed on inner hinge 404 and another piezoresistive element 2002 is placed on outer hinge 406. Electrical leads 2003 and pads 2004 connect piezoelectric element 2001 to amplifiers and processing circuitry on the fixed plate (426 in FIG. 4(b), not shown in FIG. 20). The embodiment of the mirror system 2000 shown in FIG. 20 has two piezoresistive elements 2001 and 2002, one for each hinge axis. However, other embodiments have different numbers of piezoresistive elements. For example, one embodiment has a total of four piezoresistive elements, with two elements for each hinge axis.

Figure 21:
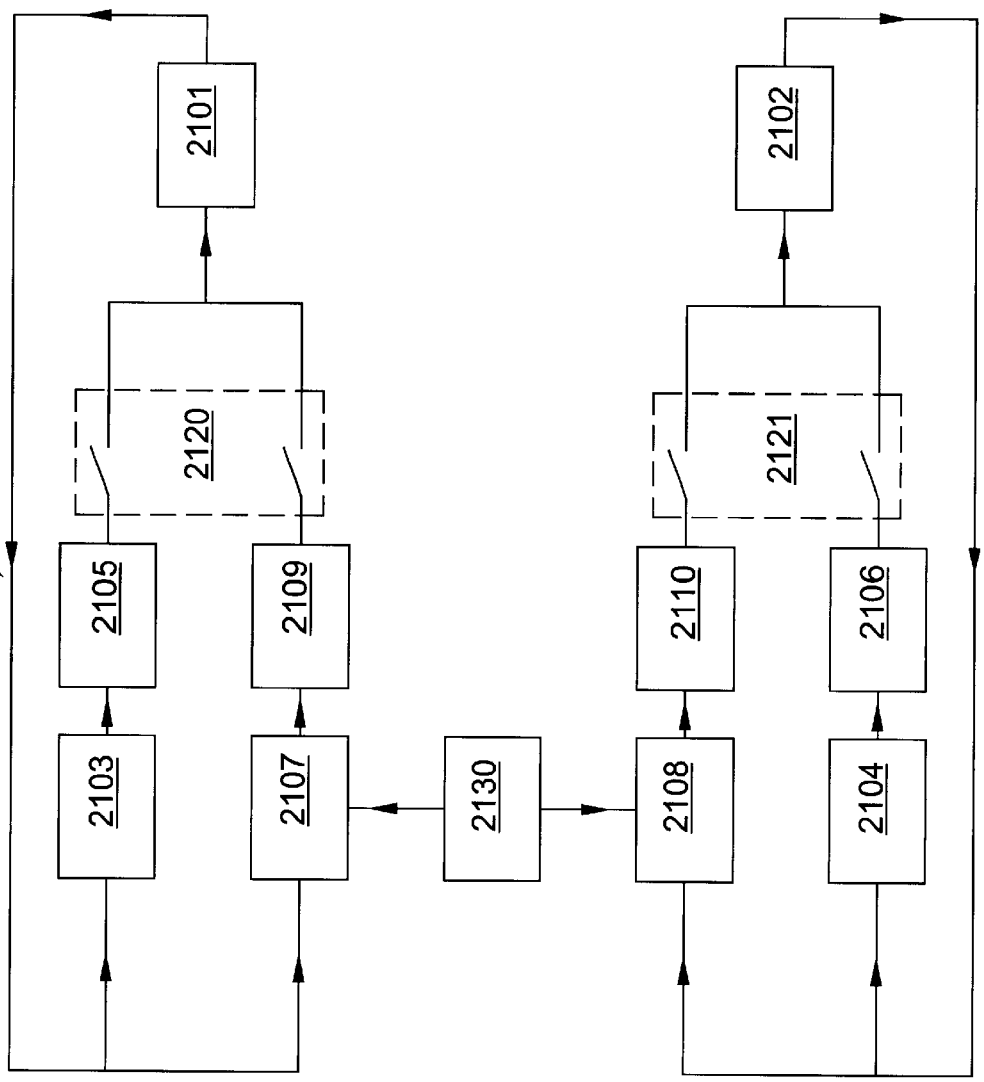
FIG. 21 is a block diagram of a servo system.

FIG. 21 shows a block diagram of an embodiment of the servo system 140 that closes the control loop using both coarse and fine positioning signals. The basic components of the servo system are x and y actuators 2101 and 2102, coarse position error signal (PES) detectors 2103 and 2104, coarse controllers 2105 and 2106, fine PES detectors 2107 and 2108, corresponding fine controllers 2109 and 2110, coarse-fine switches 2120 and 2121 and processor 2130. As discussed above, in some embodiments, the electrical positioning signals are used as coarse positioning signals while optical positioning signals are employed as fine positioning signals. Two axis positioning in x and y directions is performed with x and y actuators. Operation of closed loop servo is the same for x and y directions and is described only for the x direction. When reconfiguration of the switch is initiated, a new voltage that will approximately drive the data beam from the old to new location is applied to the x actuator. Coarse sensor 2103 generates PES x signal that is supplied into coarse controller 2105. Switch x is closed so that coarse controller drives the x actuator. When x actuator 2101 approaches the final destination, fine PES x is generated by 2107 and fed into fine controller 2109. When the coarse sensor indicates that the x actuator is at a predetermined position proximate to the correct position, switch 2120 is open on the coarse connection and closed for fine connection and fine controller 2109 drives the actuator 2101 to finely position the actuator for optimum positioning and light coupling into the outgoing fiber. The fine controller drives the actuator 2101 until the next reconfiguration instruction is received.

Fiber and Lens Arrays:

The fiber alignment structures 106 and 108 in FIGS. 1 and 3 and in FIGS. 7 and 8(a) are one- or two-dimensional depending on the size of the optical cross connect switch. Both one- and two-dimensional fiber arrays have precise fiber positioning and beam directionality. One embodiment of one-dimensional fiber arrays is a structure of V grooves in single crystal silicon. Two-dimensional fiber alignment structures 106 and 108 for incoming and outgoing fibers are formed from a micromachined array of holes in silicon.

Figure 14:
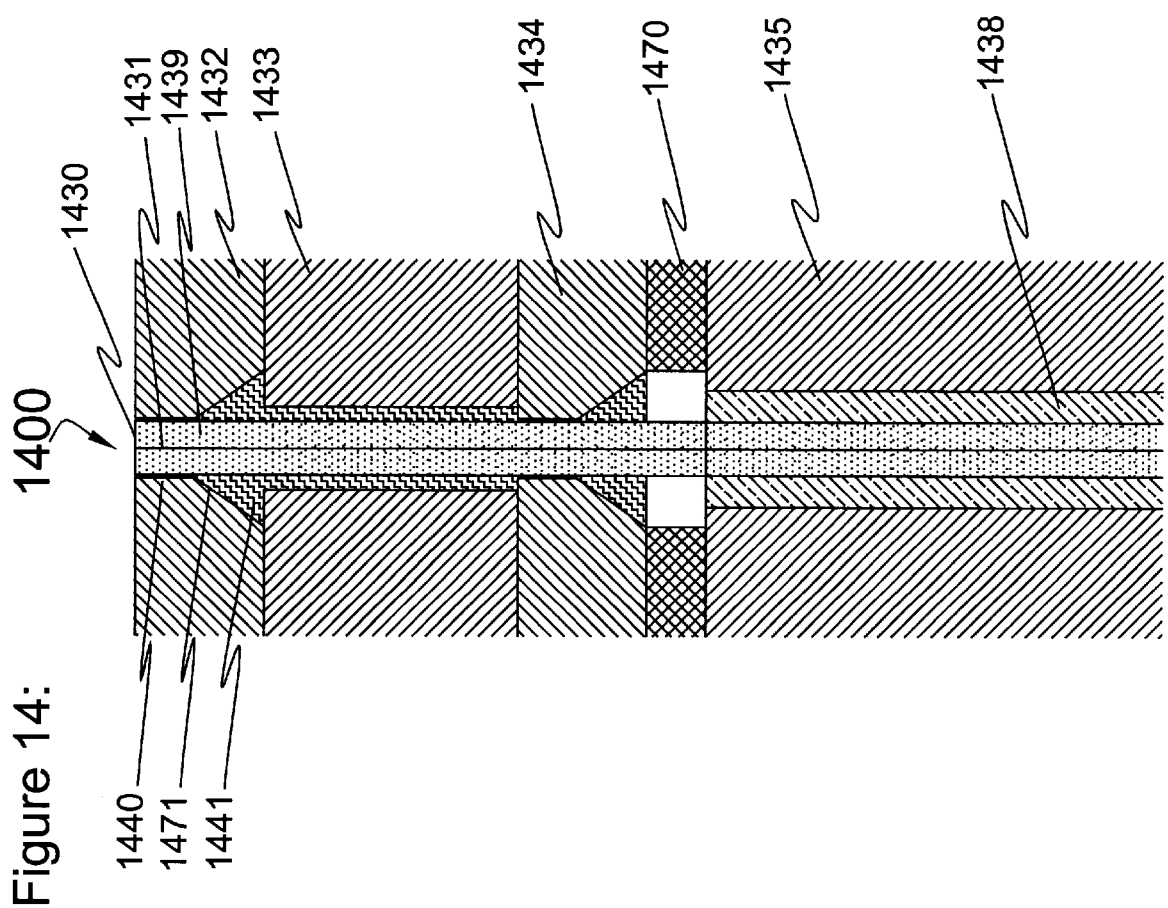
FIG. 14 illustrates an embodiment of the fiber alignment structure in cross-section.

FIG. 14 illustrates an embodiment of the fiber alignment structure 1400 in cross-section. FIG. 14 shows a section of the fiber alignment structure 1400 with one fiber 1430. The complete fiber alignment structure 1400 positions many fibers. The section of fiber 1430 within the fiber alignment structure 1400 contains a section with exposed fiber cladding 1439 and a section where the buffer 1438 is present. Multiple constricted channels or necks in the alignment layers 1432–1434 define the fiber position and also the direction of light exiting from the fiber 1430. Fiber cladding 1439 is aligned and held with precision of less than one micron by a series of alignment layers 1432 and 1434. These layers have guiding and aligning regions. The neck regions 1440 define the positions of the fibers, and the funnel regions 1441 provide a guide for massive, parallel insertion of many fibers 1430 into the structure. In order to achieve desired beam directionality, alignment layers 1432 and 1434 are separated by a spacer 1433.

An embodiment with a neck-funnel-neck-funnel (going from the surface of the fiber array 1430 towards the fiber buffer 1438) arrangement and an even or odd number of alignment layers is shown in FIG. 14. In alternate embodiments with neck-funnel-funnel-neck arrangement, both an odd number of alignment layers are used. Alignment layers 1432 and 1434 and fiber 1430 are secured together with glass or glue bonds 1471 so that a hermetic seal is formed between the fiber 1430 and alignment layers 1432 and 1434. Glass bonding provides the advantages of having a thermal coefficient match between the fiber glass and bonding glass and an environmentally stable glass seal. Glass bonding uses relatively high temperatures. Therefore, in embodiments with glass bonding, special insulation spacers 1470 are included in the alignment structures to thermally isolate buffer 1438 from alignment layers 1432–1434 during glass bonding.

The multiple constricted channels or necks in the alignment layers 1432 and 1434 define the fiber positions and also the direction of light exiting from the fiber 1430. The alignment layers 1432 and 1434 are usually fabricated from single crystal silicon. The funnel regions 1441 are defined with wet etching while neck regions 1440 are fabricated with deep relative etching of silicon.

The buffer 1438 is configured to provide crude positioning and strain relief for fiber 1430. In some embodiments, a buffer alignment block 1435 with cylindrical holes serves as a positioner and holder of buffer coatings. Alternatively, an approach similar to that used with fiber alignment layers is followed with buffer alignment layers. Openings in the buffer alignment block 1435 are larger than the funnels and bottlenecks in the fiber alignment layers 1432 and 1434 to accommodate the larger buffer diameter. Buffer 1438 and buffer alignment block 1435 are glued together to mechanically stabilize the structure and further seal it for hermetic isolation from outside environment.

The overall structure contains alignment features on each top and bottom surface of each alignment chip. In some embodiments, these alignment layers are formed by two-sided photolithography so that alignment down to one micron is possible. V grooves formed in single crystal silicon, as outlined above, present an example of an alignment structure. Fibers having precise diameter and circular cross-sections are inserted into V grooves and they self align bottom surface of one chip and the top surface of another chip. Multiple stack of chips are aligned this way and achieve chip-to-chip alignment with precision down to one micron. The structure also contains vias that go through the buffer layer and at least one alignment layer. Mechanical pins, of a controlled diameter and concentricity, are inserted into these vias to align the alignment layer and buffer block.

Lens arrays 114, 116 in FIGS. 1 and 3 or lens arrays 210 and 212 in FIG. 2 are one or two dimensional matrices of lenses. Spherical ball lenses placed in the two dimensional array of precisely micromachined cylindrical or tapered holes and lens matrices fabricated with gray scale lithography, with embossing or ink jet formation of glass or polymer are examples of the fabrication processes of microlens arrays.

Figure 15A:
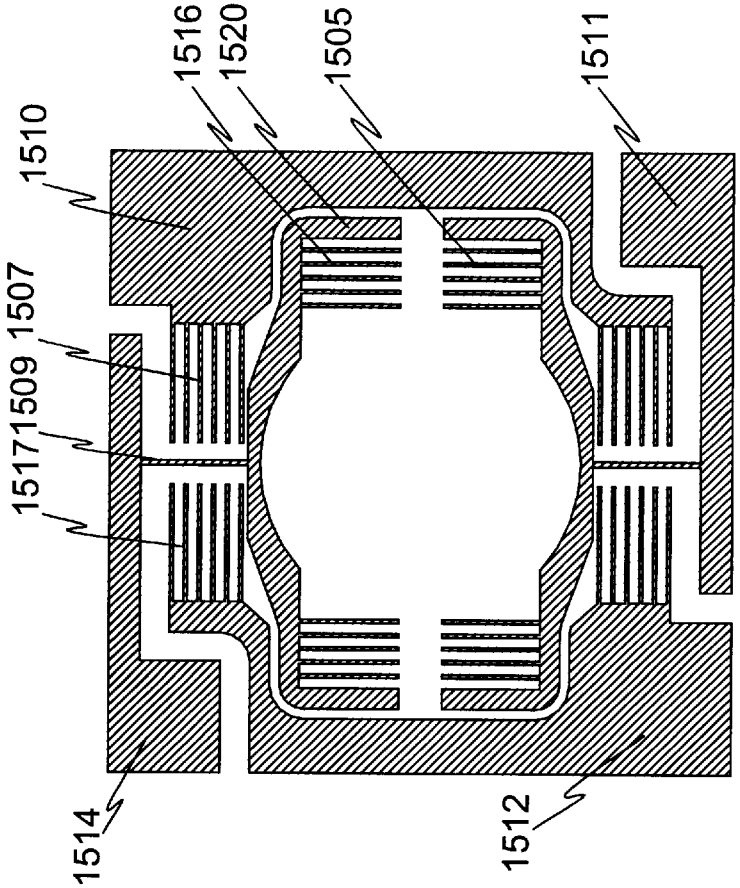
FIGS. 15(a) and 15(b) detail an electrostatically-driven MEMS mirror with a two-directional rotational comb actuator.
Figure 15B:
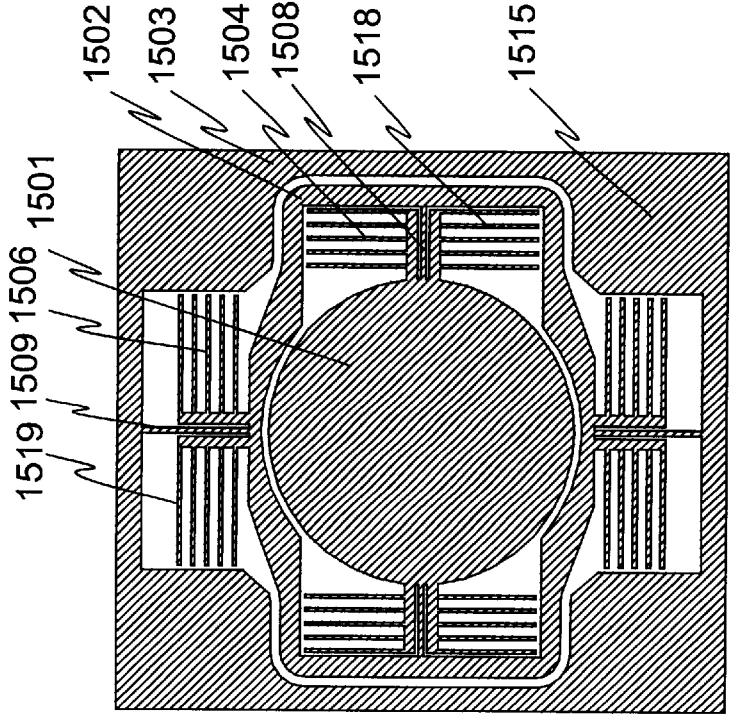

Mirror Actuator:

FIGS. 15(*a*) and 15(*b*) detail an electrostatically-driven MEMS mirror system with a two-directional rotational comb actuator. The rotational motion is generated by attractive forces between oppositely charged teeth. The MEMS mirror system has a mirror 1501, an inner frame 1502, an outer frame 1503, sets of inner movable teeth 1504 and 1518, sets of inner fixed teeth 1505 and 1516, sets of outer movable teeth 1506 and 1519, sets of outer fixed teeth 1507 and 1517, two inner hinges 1508 and two outer hinges 1509. The set of inner fixed teeth 1505 are fixed with respect to the movable inner teeth 1504, but not with respect to outer frame 1503. The top actuator portion, shown in FIG. 15(*a*), is electrically isolated from the bottom actuator part, shown in FIG. 15(*b*). The mirror 1501, teeth 1504, 1518, 1506 and 1519, inner frame 1502, outer frame 1503 and hinges 1509 and 1508 are kept at the same potential, typically ground, labeled as 1515. Voltages are applied to bottom teeth 1516, 1505, 1509 and 1517 in order to generate rotational deflections. The voltages are applied through electrically conducting blocks 1510, 1511, 1512 and 1514 that are electrically isolated from each other but are connected electrically to teeth 1507, 1505, 1517, and 1516 respectively.

The following description of the operation of the actuator only deals with one rotational deflection of the mirror 1501. However, the other deflections of mirror 1501 and inner frame 1502 are generated in the similar manner. In order to rotate the mirror 1501 around the axis defined by inner hinges 1508 so that the top part of the mirror moves down and consequently the bottom part of the mirror moves up, the voltage is applied to electrode 1514 while all other electrodes 1510, 1511 and 1512 are kept at ground. The electrostatic attraction between inner movable teeth 1504 and inner fixed teeth 1516 generates rotation around an axis going through two inner hinges 1508. In order to generate rotational motion in two directions, two different voltages are applied. One voltage is applied as described above between top ground plate 1515 and teeth 1516 and another voltage is applied between the ground plane 1515 and outer fixed teeth 1507.

The electrostatic rotational comb actuator has the advantage of generating significantly greater torque than some other actuators. Consequently, higher rotational angles can be obtained with rotational comb drive than with other types of drives, such as parallel plate drive, at the same driving voltages. Alternatively, when the same driving voltages are used, a MEMS mirror system with rotational comb drive can have much higher hinge stiffness than parallel plate drive and still obtain the same rotational angles.

Mirror Control:

The servo system operates in the following manner: The electronics continuously scans through the whole system sequentially, typically one row of photodetectors and one row of mirrors at a time, with an overall cycle period Tc. When there are N fibers present, time to detect signals from a single row of photodetectors will be about tu=Tc/sq.rt.(N). Once the signals from the photodetectors are acquired, the driving voltages to all mirrors in a given column are adjusted and kept at this level until the photodetectors are re-addressed Tc time later. In the following update period tu, the next row of photodetectors is sensed and voltages for the second set of mirror electrodes are re-adjusted. The updating time tu depends on the time necessary to acquire signals with an acceptable signal-to-noise ratio. The overall cycle period Tc depends on the number of mirrors in the array, but is typically kept below 1 msec even for large arrays. The drifts and environmental changes have a time scale that is much longer than the update time. Shock and vibration disturbances are also minimized through closed loop control. In some embodiments, closed loop servo control is used in these applications.

Other Applications:

Apart from using the above described arrays as cross connect switches, other applications include the following:

a. Optical add-drop multiplexers when N fiber lines are brought in and N+M fibers are brought out. The system permits M lines to be dropped and M other lines to be added.

b. Controlled variable optical attenuators with calibrated deflections. In other words, the light beams may be intentionally misaligned to the fiber cores in order to introduce a certain amount of attenuation.

c. Compensation of polarization mode dispersion.

While the invention has been particularly shown and described with reference to a preferred embodiment and several alternate embodiments, it will be understood by persons skilled in the relevant art that various changes in form and details can be made therein without departing from the spirit and scope of the invention.

I claim:

1. An optical cross connect switching system for directing optical signals from incoming fibers in a first optical fiber array to selected destination outgoing fibers in a second optical fiber array, the system comprising:
   a first mirror array for controllably reflecting the optical signals received from the incoming fibers, and comprising a plurality of controllably deflectable mirrors;
   a second mirror array for controllably reflecting the optical signals received from the first mirror array to the selected destination outgoing fibers, and comprising a plurality of controllably deflectable mirrors;
   a first set of position sensitive detectors for providing feedback for coarse positioning of the pluralities of controllably deflectable mirrors in the first and second mirror arrays;
   a second set of position sensitive detectors for providing feedback for fine positioning of the pluralities of controllably deflectable mirrors in the first and second mirror arrays; and
   a system controller coupled to the output of the first set of position sensitive detectors, to the output of the second set of position sensitive detectors, to the input of the first mirror array, and to the input of the second mirror array, for controlling the deflections of the pluralities of controllably deflectable mirrors in the first and second mirror arrays in response to the destination outgoing fibers selected for the optical data signals, to the feedback for coarse positioning, and to the feedback for fine positioning.

2. The system of claim 1, wherein the first set of position sensitive detectors comprises a plurality of electrical position sensing detectors.

3. The system of claim 2, wherein the plurality of electrical position sensing detectors are capacitance sensors for detecting the position of the pluralities of mirrors in the first and second mirror arrays.

4. The system of claim 2, wherein the plurality of electrical position sensing detectors are piezoresistive sensors for detecting the position of the pluralities of mirrors in the first and second mirror arrays.

5. The system of claim 2, wherein the plurality of electrical position sensing detectors sense positions of the plurality of controllably deflectable mirrors in the first and second mirror arrays.

6. The system of claim 5, wherein the plurality of electrical position sensing detectors sense translations of the plurality of controllably deflectable mirrors in the first and second mirror arrays.

7. The system of claim 5, wherein the plurality of electrical position sensing detectors sense angular deflections of the plurality of controllably deflectable mirrors in the first and second mirror arrays.

8. The system of claim 1, wherein the first set of position sensitive detectors comprises a plurality of optical position sensing detectors.

9. The system of claim 5, further comprising a beamsplitter for splitting off a portion of the optical signal and directing said portion towards the first set of position sensitive detectors.

10. The system of claim 1, wherein the second set of position sensitive detectors comprises a plurality of optical position sensing detectors.

11. The system of claim 10, further comprising light intensity monitors coupled to the outgoing fibers and the system controller for monitoring the intensity of the optical signals received by the selected destination outgoing fibers and outputting the intensity of the optical signals received by the selected destination outgoing fibers to the system controller.

12. The system of claim 10, wherein the plurality of optical position sensing detectors comprise a plurality of light intensity monitors coupled to the outgoing fibers for monitoring the intensity of the optical signals received by the selected destination outgoing fibers.

13. The system of claim 10, wherein the plurality of optical position sensing detectors are positioned in front of the plurality of optical fibers in the second optical fiber array.

14. The system of claim 10, wherein the optical signals travel from the incoming fibers to the outgoing fibers along optical paths, wherein the plurality of optical position sensing detectors are positioned outside of the optical paths, and further comprising a beamsplitter positioned in the optical paths for splitting the optical signals so that the beamsplitter directs part of the optical signals to the plurality of optical position sensing detectors.

15. The system of claim 14, wherein the beamsplitter directs part of the optical signals to the plurality of optical position sensing detectors prior to the optical signals reaching the second optical fiber array.

16. The system of claim 10, wherein the second optical fiber array comprises a surface covered by a reflective surface having openings over cores of the plurality of optical fibers in the second optical fiber array.

17. The system of claim 16, wherein the reflective surface reflects optical signals not falling onto the cores of the fibers back to a beamsplitter; which directs part of the optical signals to the plurality of optical positioning sensors.

18. The system of claim 10, wherein the optical signals comprise data optical signals and registration light having a wavelength different than wavelengths of the data optical signals.

19. The system of claim 18, further comprising a registration light source coupled to an optical fiber of the plurality of optical fibers in the first optical fiber array, for supplying the registration light.

20. The system of claim 19, wherein the optical position sensing detectors detect the wavelength of the registration light.

21. The system of claim 1, wherein the second set of position sensitive detectors comprises a plurality of electrical position sensing detectors.

22. A method for directing optical signals from incoming fibers in a first optical fiber array to selected destination outgoing fibers in a second optical fiber array in an optical cross connect switching system comprising a first mirror array comprising a plurality of controllably deflectable mirrors, a second mirror array comprising a plurality of controllably deflectable mirrors, a first set of position sensitive detectors, a second set of position sensitive detectors, and a system controller coupled to the output of the first set of position sensitive detectors, to the output of the second set of position sensitive detectors, to the input of the first mirror array, and to the input of the second mirror array, the method comprising:
   detecting with the first set of position sensitive detectors the coarse positioning of the pluralities of controllably deflectable mirrors in the first and second mirror arrays;
   controlling, with the system controller in response to the detected coarse positioning of the pluralities of controllably deflectable mirrors in the first and second mirror arrays, the deflections of the pluralities of controllably deflectable mirrors in the first and second mirror arrays to coarsely position the optical signals to be received by the selected destination outgoing fibers;

detecting with the second set of position sensitive detectors the fine positioning of the pluralities of controllably deflectable mirrors in the first and second mirror arrays; and controlling, with the system controller in response to the detected fine positioning of the pluralities of controllably deflectable mirrors in the first and second mirror arrays, the deflections of the pluralities of controllably deflectable mirrors in the first and second mirror arrays to finely position the optical signals to be received by the selected destination outgoing fibers.

23. The method of claim 22, wherein the first set of position sensitive detectors comprises a plurality of electrical position sensing detectors.

24. The method of claim 23, wherein the plurality of electrical position sensing detectors are capacitance sensors for detecting the position of the pluralities of mirrors in the first and second mirror arrays.

25. The method of claim 23, wherein the plurality of electrical position sensing detectors are piezoresistive sensors for detecting the position of the pluralities of mirrors in the first and second mirror arrays.

26. The method of claim 22, wherein the first set of position sensitive detectors comprises a plurality of optical position sensing detectors.

27. The method of claim 26, further comprising a beamsplitter for splitting off a portion of the optical signal and directing said portion towards the first set of position sensitive detectors.

28. The method of claim 22, wherein the second set of position sensitive detectors comprises a plurality of optical position sensing detectors.

29. The method of claim 28, wherein the plurality of optical position sensing detectors in the second set of position sensitive detectors are positioned in front of the plurality of optical fibers in the second optical fiber array.

30. The method of claim 28, further comprising splitting off a portion of the optical signal and directing said portion towards the second set of position sensitive detectors.

31. The method of claim 28, wherein the plurality of optical position sensing detectors detect the intensity of light that has been coupled into the selected destination outgoing fibers.

32. The method of claim 22, wherein the second set of position sensitive detectors comprises a plurality of electrical position sensing detectors.

33. An optical cross connect switching system for directing optical signals from incoming fibers in a first optical fiber array to selected destination outgoing fibers in a second optical fiber array, the system comprising:

a first optical fiber array comprising a plurality of optical fibers;

a second optical fiber array comprising a plurality of optical fibers;

a first mirror array for controllably reflecting the optical signals received from the incoming fibers along optical paths to the selected destination outgoing fibers, and comprising a plurality of controllably deflectable mirrors;

a coarse positioning detector array for providing feedback for coarse positioning of the pluralities of controllably deflectable mirrors in the first mirror array;

a fine positioning detector array for providing feedback for fine positioning of the pluralities of controllably deflectable mirrors in the first mirror array; and a system controller coupled to an output of the coarse positioning detector array, to an output of the fine positioning detector array, and to an input of the first mirror array, for controlling the deflections of the pluralities of controllably deflectable mirrors in the first mirror array in response to the destination outgoing fibers selected for the optical signals, in response to the feedback for coarse positioning, and in response to the feedback for fine positioning.

34. The system of claim 33, wherein the coarse positioning detector array comprises a plurality of electrical position sensing detectors.

35. The system of claim 34, wherein the plurality of electrical position sensing detectors sense positions of the plurality of controllably deflectable mirrors in the first mirror array.

36. The system of claim 35, wherein the plurality of electrical position sensing detectors sense translations of the plurality of controllably deflectable mirrors in the first mirror array.

37. The system of claim 35, wherein the plurality of electrical position sensing detectors sense angular deflections of the plurality of controllably deflectable mirrors in the first mirror array.

38. The system of claim 35, wherein the plurality of electrical position sensing detectors comprise a plurality of capacitance sensors.

39. The system of claim 35, wherein the plurality of electrical position sensing detectors comprise a plurality of piezoresistive sensors.

40. The system of claim 33, wherein the coarse positioning detector array comprises a plurality of optical position sensing detectors.

41. The system of claim 40, wherein the plurality of optical position sensing detectors in the coarse positioning detector array are positioned in front of the plurality of optical fibers in the second optical fiber array.

42. The system of claim 40, wherein the plurality of optical position sensing detectors in the coarse positioning detector array are positioned outside of the optical paths, and further comprising a beamsplitter positioned in the optical paths for splitting the optical signals so that the beamsplitter directs part of the optical signals to the plurality of optical position sensing detectors in the coarse positioning detector array.

43. The system of claim 42, wherein the beamsplitter directs part of the optical signals to the plurality of optical position sensing detectors in the coarse positioning detector array prior to the optical signals reaching the second optical fiber array.

44. The system of claim 42, wherein the second optical fiber array comprises a surface covered by a reflective surface having openings over cores of the plurality of optical fibers in the second optical fiber array.

45. The system of claim 44, wherein the reflective surface reflects optical signals not falling onto the cores of the fibers back to the beamsplitter, which directs part of the optical signals to the plurality of optical positioning sensors.

46. The system of claim 40, wherein the plurality of optical position sensing detectors detect the intensity of light that has been coupled into the selected destination outgoing fibers.

47. The system of claim 46, further comprising a plurality of splitters that split some of the light that has been coupled into the selected destination outgoing fibers and send the split light to the plurality of optical position sensing detectors.

48. The system of claim 47, wherein the plurality of splitters are a plurality of diffraction gratings induced in the cores of the plurality of optical fibers in the second optical fiber array.

49. The system of claim 47, wherein each splitter is a gap in one of the plurality of optical fibers in the second optical fiber array, wherein a small amount of light is reflected out of the gap and into an optical positioning sensor in the coarse positioning detector array.

50. The system of claim 40, wherein the plurality of optical position sensing detectors in the coarse positioning detector array are bilateral photodetectors.

51. The system of claim 40, wherein the plurality of optical position sensing detectors in the coarse positioning detector array are quadrant photodetectors.

52. The system of claim 40, wherein the plurality of optical position sensing detectors in the coarse positioning detector array are complementary metal oxide semiconductor imaging arrays.

53. The system of claim 40, wherein the plurality of optical position sensing detectors in the coarse positioning detector array are charge coupled device imaging arrays.

54. The system of claim 40, wherein the plurality of optical position sensing detectors in the coarse positioning detector array are infrared imaging arrays.

55. The system of claim 40, wherein the optical signals are data signals having one or more wavelengths and the optical position sensing detectors detect the one or more wavelengths of the data signals.

56. The system of claim 40, wherein the optical signals comprise data optical signals and registration light having a wavelength different than wavelengths of the data optical signals.

57. The system of claim 56, further comprising a registration light source coupled to an optical fiber of the plurality of optical fibers in the first optical fiber array, for supplying the registration light.

58. The system of claim 57, wherein the optical position sensing detectors detect the wavelength of the registration light.

59. The system of claim 33, wherein the fine positioning detector array comprises a plurality of optical position sensing detectors.

60. The system of claim 59, wherein the plurality of optical position sensing detectors in the fine positioning detector array are positioned in front of the plurality of optical fibers in the second optical fiber array.

61. The system of claim 59, wherein the plurality of optical position sensing detectors in the fine positioning detector array are positioned outside of the optical paths, and further comprising a beamsplitter positioned in the optical paths for splitting the optical signals so that the beamsplitter directs part of the optical signals to the plurality of optical position sensing detectors in the fine positioning detector array.

62. The system of claim 61, wherein the beamsplitter directs part of the optical signals to the plurality of optical position sensing detectors in the fine positioning detector array prior to the optical signals reaching the second optical fiber array.

63. The system of claim 59, wherein the second optical fiber array comprises a surface covered by a reflective surface having openings over cores of the plurality of optical fibers in the second optical fiber array.

64. The system of claim 63, wherein the reflective surface reflects optical signals not falling onto the cores of the fibers back to a beamsplitter, which directs part of the optical signals to the plurality of optical positioning sensors.

65. The system of claim 59, wherein the plurality of optical position sensing detectors detect the intensity of light that has been coupled into the selected destination outgoing fibers.

66. The system of claim 65, further comprising a plurality of splitters that split some of the light that has been coupled into the selected destination outgoing fibers and send the split light to the plurality of optical position sensing detectors.

67. The system of claim 66, wherein the plurality of splitters are a plurality of diffraction gratings induced in the cores of the plurality of optical fibers in the second optical fiber array.

68. The system of claim 66, wherein each splitter is a gap in one of the plurality of optical fibers in the second optical fiber array, wherein a small amount of light is reflected out of the gap and into an optical positioning sensor in the fine positioning detector array.

69. The system of claim 59, wherein the plurality of optical position sensing detectors in the fine positioning detector array are bilateral photodetectors.

70. The system of claim 59, wherein the plurality of optical position sensing detectors in the fine positioning detector array are quadrant photodetectors.

71. The system of claim 59, wherein the plurality of optical position sensing detectors in the fine positioning detector array are complementary metal oxide semiconductor imaging arrays.

72. The system of claim 59, wherein the plurality of optical position sensing detectors in the fine positioning detector array are charge coupled device imaging arrays.

73. The system of claim 59, wherein the plurality of optical position sensing detectors in the fine positioning detector array are infrared imaging arrays.

74. The system of claim 59, wherein the optical signals are data signals having one or more wavelengths and the optical position sensing detectors detect the one or more wavelengths of the data signals.

75. The system of claim 59, wherein the optical signals comprise data optical signals and registration light having a wavelength different than wavelengths of the data optical signals.

76. The system of claim 75, further comprising a registration light source coupled to an optical fiber of the plurality of optical fibers in the first optical fiber array, for supplying the registration light.

77. The system of claim 76, wherein the optical position sensing detectors detect the wavelength of the registration light.

78. The system of claim 33, wherein the fine positioning detector array comprises a plurality of electrical position sensing detectors.

79. A method for directing optical signals along optical paths from incoming fibers in a first optical fiber array to selected destination outgoing fibers in a second optical fiber array in an optical cross connect switching system comprising a first mirror array comprising a plurality of controllably deflectable mirrors, a coarse positioning detector array, a fine positioning detector array, and a system controller coupled to an output of the coarse positioning detector array, to an output of the fine positioning detector array, and to an input of the first mirror array, and to an input of a second mirror array, the.method comprising:

detecting with the coarse positioning detector array the coarse positioning of the plurality of controllably deflectable mirrors in the first mirror array;

controlling, with the system controller in response to the detected coarse positioning of the plurality of controllably deflectable mirrors in the first mirror array, the deflections of the plurality of controllably deflectable mirrors in the first mirror array to coarsely position the optical signals to be received by the selected destination outgoing fibers;

detecting with the fine positioning detector array the fine positioning of the plurality of controllably deflectable mirrors in the first mirror array; and controlling, with the system controller in response to the detected fine positioning of the plurality of controllably deflectable mirrors in the first mirror array, the deflections of the plurality of controllably deflectable mirrors in the first mirror array to finely position the optical signals to be received by the selected destination outgoing fibers.

80. The method of claim 79, wherein detecting the coarse positioning of the plurality of controllably deflectable mirrors in the first mirror array comprises detecting the position of the mirrors with electrical position sensing detectors.

81. The method of claim 80, wherein the electrical position sensing detectors are a plurality of capacitance sensors.

82. The method of claim 80, wherein the electrical position sensing detectors are a plurality of piezoresistive sensors.

83. The method of claim 79, wherein detecting the coarse positioning of the plurality of controllably deflectable mirrors in the first mirror array comprises detecting the position of the mirrors with optical position sensing detectors.

84. The method of claim 83, wherein the plurality of optical position sensing detectors are positioned in front of the optical fibers in the second optical fiber array.

85. The method of claim 83, wherein the plurality of optical position sensing detectors are positioned outside of the optical paths.

86. The method of claim 83, wherein the plurality of optical position sensing detectors detect the intensity of light that has been coupled into the selected destination outgoing fibers.

87. The method of claim 79, wherein detecting the fine positioning of the plurality of controllably deflectable mirrors in the first mirror array comprises detecting the position of the mirrors with optical position sensing detectors.

88. The method of claim 87, wherein the plurality of optical position sensing detectors are positioned in front of the optical fibers in the second optical fiber array.

89. The method of claim 87, wherein the plurality of optical position sensing detectors are positioned outside of the optical paths.

90. The method of claim 87, wherein the plurality of optical position sensing detectors detect the intensity of light that has been coupled into the selected destination outgoing fibers.

91. The method of claim 79, wherein detecting the fine positioning of the plurality of controllably deflectable mirrors in the first mirror array comprises detecting the position of the mirrors with electrical position sensing detectors.

92. The method of claim 79, further comprising calibrating the coarse positioning detector array.

93. The method of claim 92, wherein calibrating the coarse positioning detector array comprises measuring a light intensity that reaches the selected destination outgoing fibers.

94. The method of claim 93, wherein calibrating the coarse positioning detector array further comprises moving the plurality of mirrors in the first mirror array in small incremental steps.

95. The method of claim 79, further comprising calibrating the fine positioning detector array.

96. The method of claim 95, wherein calibrating the fine positioning detector array comprises measuring a light intensity that reaches the selected destination outgoing fibers.

97. The method of claim 96, wherein calibrating the fine positioning detector array further comprises moving the plurality of mirrors in the first mirror array in small incremental steps.

* * * * *